(12) United States Patent
Sloan

(10) Patent No.: US 11,197,074 B2
(45) Date of Patent: *Dec. 7, 2021

(54) SYNCHRONIZED VIDEO ANNOTATION AND CONTROL SYSTEM FOR SEXUAL STIMULATION DEVICES

(71) Applicant: Brian Sloan, Mercer Island, WA (US)

(72) Inventor: Brian Sloan, Mercer Island, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/942,751

(22) Filed: Jul. 29, 2020

(65) Prior Publication Data

US 2020/0366972 A1    Nov. 19, 2020

Related U.S. Application Data

(63) Continuation-in-part of application No. 16/861,014, filed on Apr. 28, 2020, which is a continuation-in-part of application No. 16/214,030, filed on Dec. 7, 2018, now Pat. No. 10,638,174, which is a continuation-in-part of application No. 16/139,550, filed on Sep. 24, 2018, now Pat. No. 10,576,013.

(51) Int. Cl.
| | |
|---|---|
| *H04N 21/8545* | (2011.01) |
| *H04N 21/422* | (2011.01) |
| *H04N 21/475* | (2011.01) |
| *H04N 21/472* | (2011.01) |
| *H04N 21/8547* | (2011.01) |
| *A61H 19/00* | (2006.01) |
| *H04N 21/478* | (2011.01) |
| *G06Q 20/12* | (2012.01) |

(52) U.S. Cl.
CPC ......... *H04N 21/8545* (2013.01); *A61H 19/00* (2013.01); *H04N 21/4222* (2013.01); *H04N 21/4751* (2013.01); *H04N 21/47205* (2013.01); *H04N 21/47217* (2013.01); *H04N 21/47815* (2013.01); *H04N 21/8547* (2013.01); *G06Q 20/1235* (2013.01)

(58) Field of Classification Search
None
See application file for complete search history.

(56) References Cited

U.S. PATENT DOCUMENTS

| | | | |
|---|---|---|---|
| 6,433,771 B1* | 8/2002 | Yocum | B25J 9/1689 345/156 |
| 10,469,750 B1 | 11/2019 | Canfield et al. | |
| 2008/0228580 A1* | 9/2008 | Korman | G06Q 30/02 705/14.27 |
| 2009/0210779 A1* | 8/2009 | Badoiu | G06F 16/7867 715/230 |
| 2010/0045595 A1 | 2/2010 | Bakke | |
| 2011/0133910 A1* | 6/2011 | Alarcon | A61H 19/32 340/407.1 |
| 2011/0321072 A1* | 12/2011 | Patterson | H04N 21/252 725/5 |

(Continued)

*Primary Examiner* — Alexander Q Huerta
(74) *Attorney, Agent, or Firm* — Galvin Patent Law LLC; Brian R. Galvin; Brian S. Boon

(57) ABSTRACT

A system and method for creating and sharing synchronized video control data for sexual stimulation devices that allows for automated synchronization with any video of sexual activity and allows for comprehensive personalization and customization of the video selection, synchronization, and sharing experience based on the user's preferences and biometric data.

5 Claims, 23 Drawing Sheets

(56) References Cited

U.S. PATENT DOCUMENTS

| | | | | |
|---|---|---|---|---|
| 2013/0038792 A1* | 2/2013 | Quigley | ................. | A61H 19/44 348/515 |
| 2013/0227410 A1* | 8/2013 | Sridhara | .............. | H04N 21/435 715/702 |
| 2013/0311881 A1* | 11/2013 | Birnbaum | ............... | G06F 3/016 715/702 |
| 2014/0205267 A1* | 7/2014 | Poniatowski | .... | H04N 21/44008 386/250 |
| 2014/0378759 A1* | 12/2014 | Fang | ..................... | A61H 23/02 600/38 |
| 2015/0199015 A1* | 7/2015 | Ullrich | ................... | H04N 21/81 345/156 |
| 2015/0262376 A1* | 9/2015 | Saboune | .............. | H04N 21/845 386/219 |
| 2015/0328082 A1* | 11/2015 | Jiang | ..................... | A61H 19/44 600/38 |
| 2016/0279020 A1* | 9/2016 | Timmermans | ......... | A61H 19/50 |
| 2017/0366858 A1* | 12/2017 | Olivares, II | .......... | H04W 76/14 |
| 2018/0147110 A1 | 5/2018 | Cakmak | | |

* cited by examiner

Community portal 120

- Video sharing portal 401
- Themed areas 404
- Group area 402
- Private session portal 405
- Forums / discussion boards 403
- Trust / rating system 406

Fig. 4

Manual tagging application 900
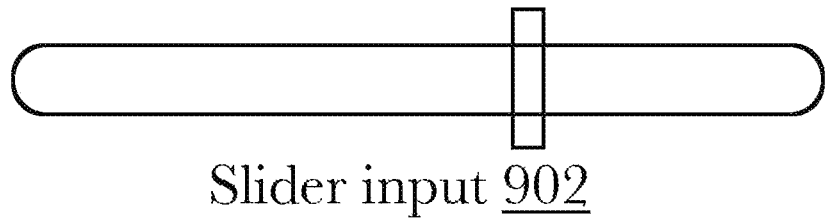
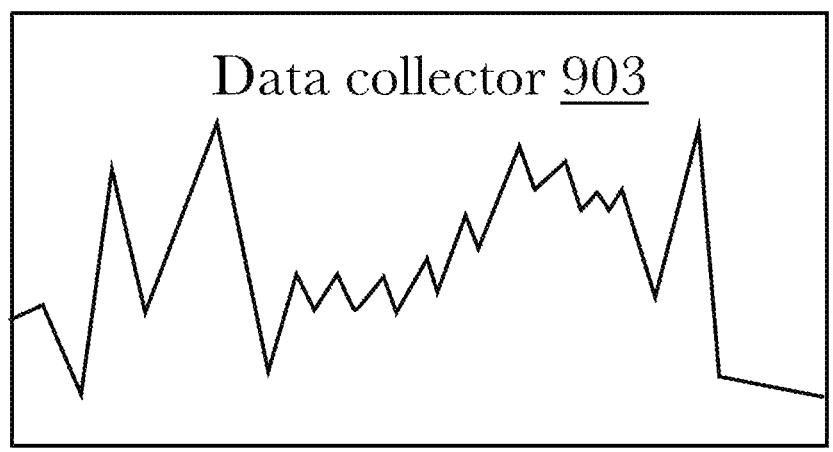
Fig. 9

SYNCHRONIZED VIDEO ANNOTATION AND CONTROL SYSTEM FOR SEXUAL STIMULATION DEVICES

CROSS-REFERENCE TO RELATED APPLICATIONS

BACKGROUND

Field of the Art

The present invention is in the field of computer control systems, and more specifically the field of synchronized video control systems for sexual stimulation devices.

Discussion of the State of the Art

In the field of sexual stimulation devices, there are examples of control systems that allow for synchronization of the device with videos of sexual activity. However, existing systems are extremely limited in their functionality. They contain only limited libraries of manually pre-programmed synchronized stimulation routines, cannot recognize video content on their own, cannot automatically create their own stimulation routines, do not allow users to annotate and customize their own routines for videos, and cannot customize the experience for the user using biometric data about the user.

What is needed is a system for creating and sharing synchronized video control data for sexual stimulation devices that allows for automated synchronization with videos of sexual activity and allows for comprehensive personalization and customization of the video annotation, selection, synchronization, and sharing experience based on the user's preferences and biometric data.

SUMMARY

Accordingly, the inventor has conceived, and reduced to practice, a system for creating and sharing synchronized video control data for sexual stimulation devices that allows for automated synchronization with videos of sexual activity and allows for comprehensive personalization and customization of the video annotation, selection, synchronization, and sharing experience based on the user's preferences and biometric data.

According to a preferred embodiment, a system for creating synchronized video control data for sexual stimulation devices is disclosed, comprising: a computing device comprising a memory, a processor, a non-volatile data storage device, and a display; a video annotation system comprising a first plurality of programming instructions stored in the memory and operating on the processor, wherein the first plurality of programming instructions, when operating on the processor, causes the computing device to: display video content comprising depictions of sexual activity on the display; receive motion input data from a user corresponding to a movement shown in the video, wherein the motion input data track the movement shown in the video over time and wherein each motion input datum is associated with a playback time of the video content; and store the motion input data as metadata associated with the video content.

According to another preferred embodiment, a method for creating synchronized video control data for sexual stimulation devices is disclosed, comprising the steps of: displaying video content comprising depictions of sexual activity on a display; receiving motion input data from a user corresponding to a movement shown in the video, wherein the motion input data track the movement shown in the video over time and wherein each motion input datum is associated with a playback time of the video content; and storing the motion input data as metadata associated with the video content.

According to another preferred embodiment, a system for creating synchronized video control data for sexual stimulation devices is disclosed, comprising: a computing device comprising a memory, a processor, a non-volatile data storage device, and a display a video analysis engine comprising a first plurality of programming instructions stored in the memory and operating on the processor, wherein the first plurality of programming instructions, when operating on the processor, causes the computing device to: retrieve video content comprising depictions of sexual activity; analyze the video content to identify a movement shown in the video content and track the movement over time; create motion data for the movement over time, wherein each motion datum is associated with a playback time of the video content; and store the motion data as metadata associated with the video content.

According to an aspect of an embodiment, a video synchronized device controller is used to: retrieve the video content and the metadata; convert the metadata to device control data, the device control data comprising a position of an electronically controllable moving part of a sexual stimulation device for each motion input datum and playback time; display the video content; and as the video content is displayed, continuously determine a current playback time of the video content and transmit the device control data for that current playback time to the sexual stimulation device.

According to an aspect of an embodiment, a crowdsourcing portal is used to: establish a user portal for users to create user accounts; and provide users with compensation for annotating videos using the video annotation system.

According to an aspect of an embodiment, the crowdsourcing portal is further configured to allow users to establish an online store for sale of their video annotations to other users.

According to an aspect of an embodiment, a video selection engine is used to: allow users to enter preferences as to video content; search local storage or the internet for videos containing content related to the user's preferences; and if the videos are not already annotated, allow users to annotate the video content; and use the video content to control a compatible sexual stimulation device.

BRIEF DESCRIPTION OF THE DRAWING FIGURES

The accompanying drawings illustrate several aspects and, together with the description, serve to explain the principles of the invention according to the aspects. It will be appreciated by one skilled in the art that the particular arrangements illustrated in the drawings are merely exemplary, and are not to be considered as limiting of the scope of the invention or the claims herein in any way.

FIG. 4 shows additional components of a community portal, according to one aspect.

FIG. 9 shows additional components of a manual tagging application, according to one aspect.

DETAILED DESCRIPTION

Figure 1:
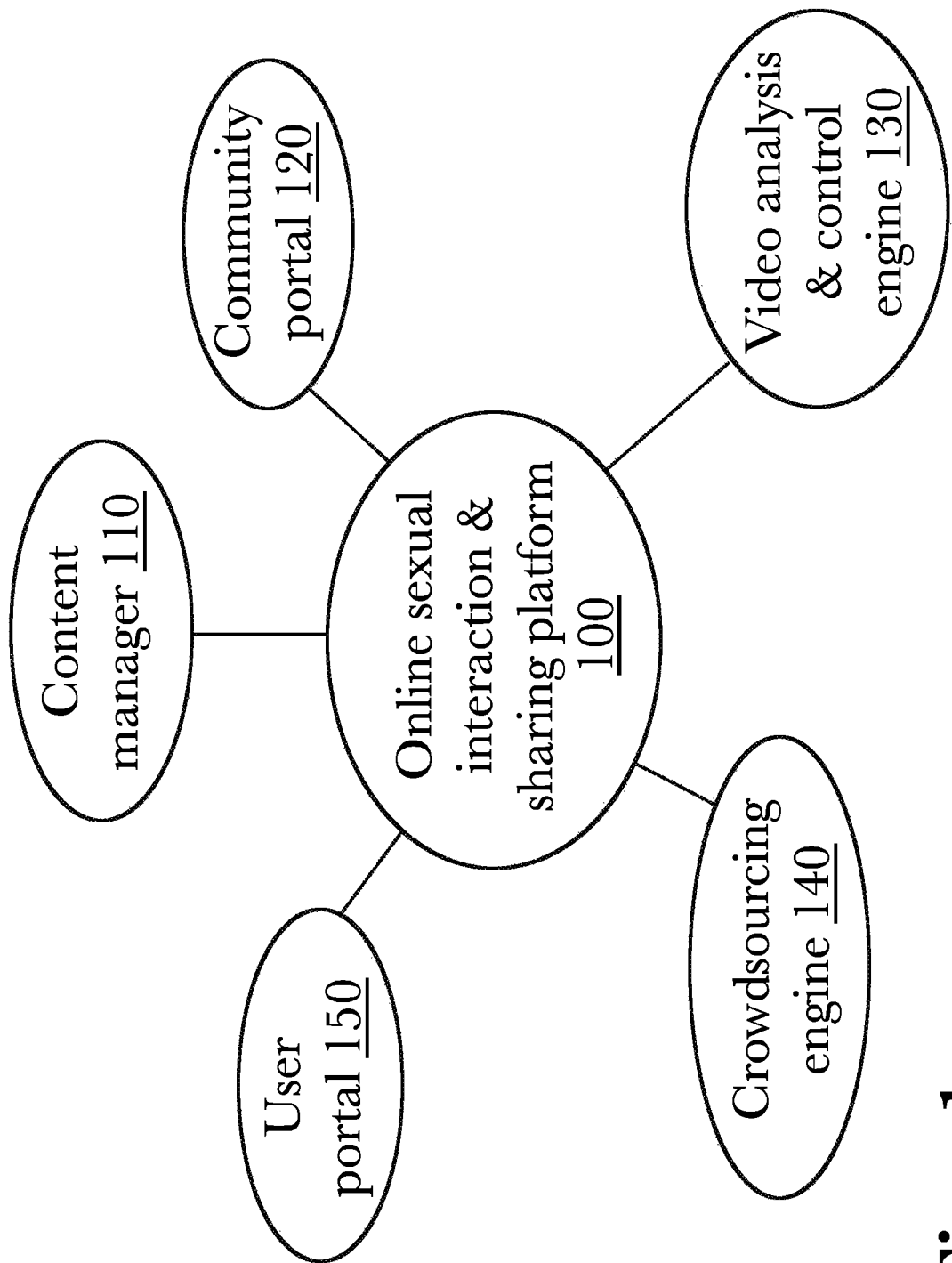
FIG. 1 shows an overview of a sexual interaction and sharing platform, according to a preferred embodiment.

The inventor has conceived, and reduced to practice, a system and method for creating and sharing synchronized video control data for sexual stimulation devices that allows for automated synchronization with any video of sexual activity and allows for comprehensive personalization and customization of the video selection, synchronization, and sharing experience based on the user's preferences and biometric data.

In the field of sexual stimulation devices, there are examples of control systems for such devices that allow for synchronization of the device with videos of sexual activity. These control systems attempt to replicate the sexual activities shown on the screen through synchronization of the video with some form of sexual stimulation device. However, existing systems cannot synchronize with any video of sexual activity. They must be manually pre-programmed for each video. As a result, they contain only limited libraries of video-synchronized stimulation routines. Further, since they are manually pre-programmed, the experience is the same for every user, and cannot be customized to the user's preferences or biometric data. the library of tagged videos is very small and therefore users may not find videos that contain sexual activities matching their sexual preferences for watching such videos. Further such systems cannot customize the experience for the user using biometric data about the user such as differences in anatomy. There are numerous improvements of this invention over the prior art, such as automated real time video analysis and synchronization and broad customization of the user experience based on user preferences and the user's biometric data.

In an aspect of an embodiment, the system allows users to manually tag videos containing sexual content by moving an on-screen slider bar in a manner corresponding to the movements the user sees in the video. The tagging information is stored, and may be transmitted directly to a compatible sexual stimulation device so that the user can feel in real time the actions indicated by the slider bar, and thus confirm whether the data accurately captures the movements the user sees in the video. The data from the on-screen slider can also be stored by the system for later use, or for sharing with others who have similarly compatible sexual stimulation devices.

In another aspect of an embodiment, the manual tagging data from a plurality of users may be rated by other users for accuracy and/or realism, allowing a community of users to collectively determine via a rating system which manual tagging data are most accurate and realistic for a particular video or videos.

In another aspect of an embodiment, the control system uses automated, real-time video analysis and machine learning algorithms to identify components of the sexual activity in the video such as movement, pressure, and rhythm, as opposed to existing systems which require manually pre-programming the controller to match the perceived activity in the videos. Using real-time video analysis allows access to the entirety of sexual video content available on the internet. Any video containing sexual content could be used with the system, which allows the user to choose videos with very specific content based on the user's preferences.

In another aspect of an embodiment, the manual tagging data from a plurality of users may be processed through machine learning algorithms to train the automated, real-time video analysis system to more accurately mimic the sexual content of videos. A variety of methods may be used for combining or selecting the manual tagging data to be used for such training, including the rating system described above for community rating of manual tagging data as accurate and realistic.

Since any video containing sexual content can be used, the system can be tuned to mimic the sexual activity of particular actors or actresses engaging in specific sexual activities. The machine learning algorithms used to conduct the video analysis could be fed metadata about the videos such as the names of the actor or actress, or perform facial recognition to identify videos containing certain actors and actresses, such that the control system could learn to "perform" certain sexual activities just like a certain actor or actress does generally, or even in a particular film. Likewise, since any video can be used with this control system, and since the synchronization with the videos can be either automated or controlled by the user, the opportunities for customization and sharing are unlimited. Users would have the opportunity to customize the stimulation associated with videos in myriad ways, and share those customized experiences with others by sharing the control system file associated with that video. Further, users could create videos of their own sexual activity, and "share" their experience with others remotely through this control system and an appropriate stimulation device.

Another major benefit of this control system is the broad customization allowed based on user profiles. At the most basic level, users can simply watch a video, and allow the system to control the device based on the system's automated video parsing without any adjustment or input. However, the system is not limited to such usage. The system could be used with a manual form of input such as a slider bar on the screen, which allows users to map their own perception of the movement and sexual activity in the video.

The system could allow users to set up a profile containing parameters and preferences for operation of the compatible sexual stimulation device. For example, the user could set a parameter indicating that the device should speed up or slow down when certain movements in the video are detected. Further, combining these parameters with biometric sensor data could allow the user to indicate that the device should attempt to prolong orgasm for a certain period of time. For example, the user could set a parameter indicating that orgasm should be delayed at least 15 minutes, and this parameter, combined with biometric data of breathing rate, heart rate, penile stiffness, etc., could cause the control system to slow down or stop stimulation until the biometric data falls back within certain ranges, at which point the device would continue stimulation as usual. A myriad of parameters, preferences, and biometric data ranges could be used. For example, the control system could be instructed to delay orgasm, prevent orgasm, or hold the user at a given level of excitement.

Further, metadata can be captured from the video related to the video content including, for example, the actor or actress in the video, the type of sexual activity, the position or orientation of the sexual activity, the location or scene in which the sexual activity occurs, and the style or category of the video content (e.g., oral sex, anal sex, gay sex, fetish). Using metadata associated with the videos, the control system could select or suggest videos containing very specific content based on the user's preferences. Such metadata may already be embedded in the videos, may be available on the internet, or may be developed by having users input such metadata in a growing library of such videos. Further, biometric data, for example penis length and girth for males, and vaginal temperature and vaginal blood flow for females, can be entered into the user profile, and the stimulation provided by the control system can be automatically adjusted to provide the user a customized, better feeling, more realistic experience based on those dimensions. For females, the amount of vaginal secretions could be measured using sensors on a compatible device, and the compatible device's operation could be adjusted accordingly. Optionally, other types of biometric data such as heart rate, breathing rate, and penile stiffness could be captured by a variety of commercially available devices (for example, sports training monitors), or by sensors on the stimulation device, itself, and fed back to the user profile to automatically optimize the video content and types of stimulation preferred by the user.

In another aspect of an embodiment, the system could provide the user with a wider variety of videos that match the user's preferences. For example, users could manually tag a small subset of videos with synchronized stimulation routines, which could then be applied by the machine learning algorithms to very large databases of videos to learn which videos contain that sort of sexual activity. Clustering could be used to identify certain types of sexual activity preferred by the user, based on the movement, rhythm, and pressure associated with them. User ratings in some portal or online platform could help refine the video selection outputs and extrapolations generated by the machine learning algorithms.

In some embodiments, all components of the video control system may be located on a general purpose computer. In other embodiments, some components of the video control system may be located on the compatible stimulation device as embedded computer components or systems. For example, a compatible stimulation device may contain an embedded computer component or systems that act as the device controller, which receives signals from a video analysis engine and causes the compatible stimulation device to operate in accordance with those signals. In some aspects of some embodiments, such an embedded computer component or system might contain programmed sequences of movements or other content such that the bandwidth required to transmit signals to the device can be reduced by sending references to the programmed sequences of movements.

Definitions

"Annotation," "tag," and "tagging" as used herein mean the annotation or encoding of video files with additional information that allows for the control of compatible stimulation devices in synchronization with activities in the video. The annotation may be added to the video file itself, or may be a separate file or files that contain information related to the video. Annotations may be saved as metadata.

"Metadata" as used herein means any information that describes or enhances the video content of a video file. Metadata may be stored as part of the video file or as a separate file.

Conceptual Architecture

FIG. 1 shows an overview of a sexual interaction and sharing platform 100, according to a preferred embodiment. According to the embodiment, a sexual interaction and sharing platform 100 may comprise a user portal 150 the stores and provides user profiles, preferences, and other data as well as maintains lists of trusted or shared users and other associations. A content manager 110 may be used to handle the storage and retrieval of media content, such as images and videos. A community portal 120 may be used to provide a trust or rating system that may be used to manage user relationships and associations and provide the groundwork for a variety of shared user spaces such as a video sharing portal for watching content with other users, a private session portal for sharing experiences with specific users in a private setting, themed areas that may provide experiences catering to specific topics or styles, and discussion boards or other social networking features. A crowdsourcing engine 140 may be used to provide additional content to users such as newly-created or exclusive content, rewards programs such as actual money or proprietary tokens or other benefits, as well as online marketplaces and vendors that may provide a variety of paid content or products, and from which the platform 100 may receive a fee or percentage. A video analysis and control engine 130 may be used to provide an application portal for manually tagging media as well as an artificial intelligence (AI) driven automated tagging engine, as well as storing videos and their associated tags and other metadata and providing features for remote control of stimulation devices for shared experiences.

Figure 2:
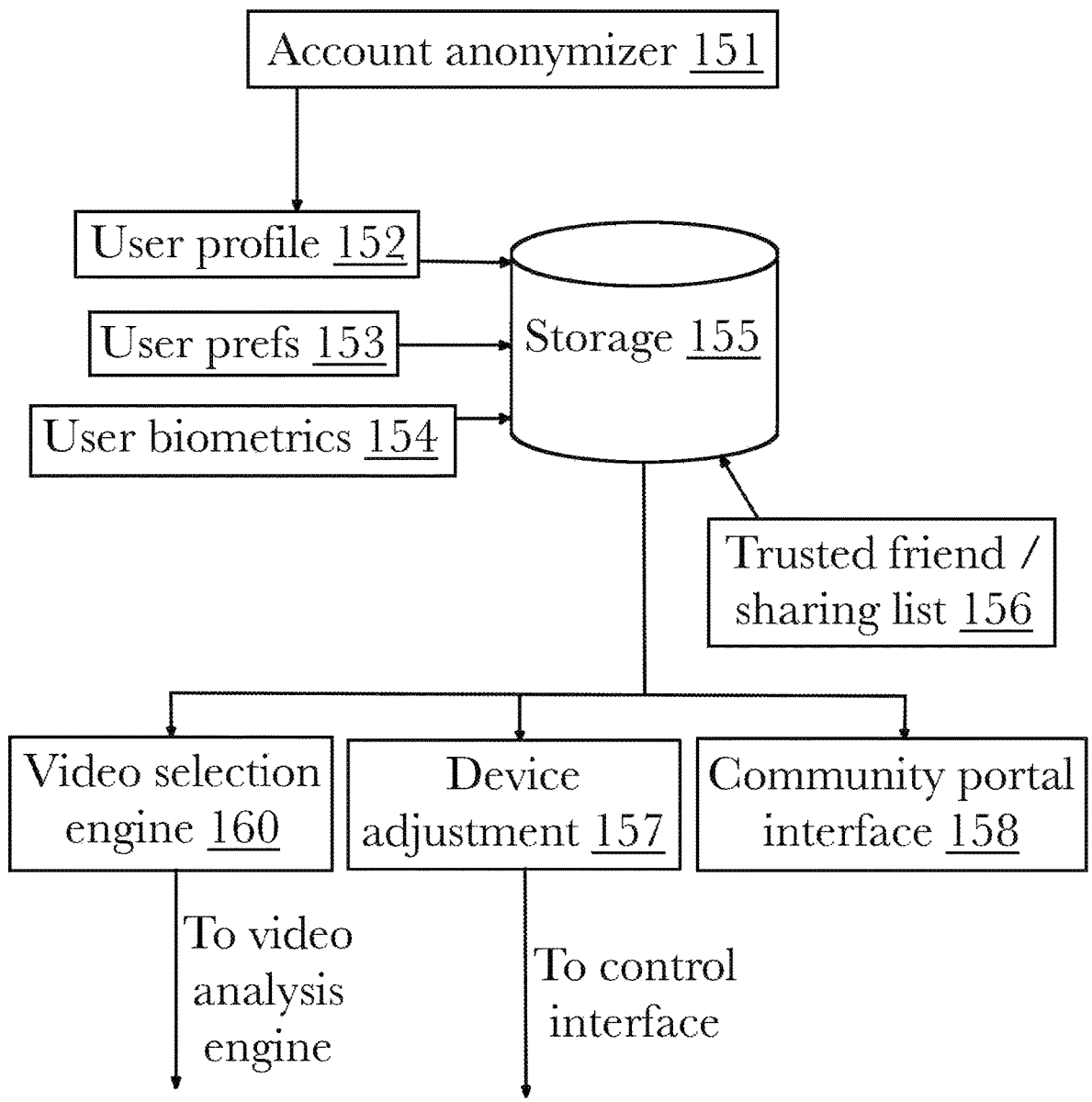
FIG. 2 shows additional components of a user portal, according to one aspect.

FIG. 2 shows additional components of a user portal 150, according to one aspect. According to the aspect, a user portal 150 may comprise a central storage 155 for user information, including (but not limited to) user profiles 152, preferences 153 such as preferences for application or device settings or themed areas, or user biometric data 154 such as various metrics that may be collected by devices for or during use, such as (for example) penis girth or length, body temperature, heart rate, and other biometric data. An account anonymizer 151 may be utilized to anonymize accounts for privacy reasons, such as by obfuscating personally-identifiable details such as name or location. A trusted friend and sharing list 156 may be used to maintain user associations and relationships, such as users that have added each other as "friends" in a discussion board, or have participated in group media viewing or shared experiences. User data from storage 155 may be provided for use by other components for operation, such as a video selection engine 160 that may select and retrieve videos according to a user's preferences and provide them to a video analysis engine, a device adjustment driver 157 that may direct remote-operated stimulation devices and provide control commands to a control interface, and a community portal interface 158 that may incorporate user details into a community setting for socialization and other interactions. Data encryption may be used to protect sensitive user data such as user profile 152, user preferences 153, and user biometrics 154.

Figure 3:
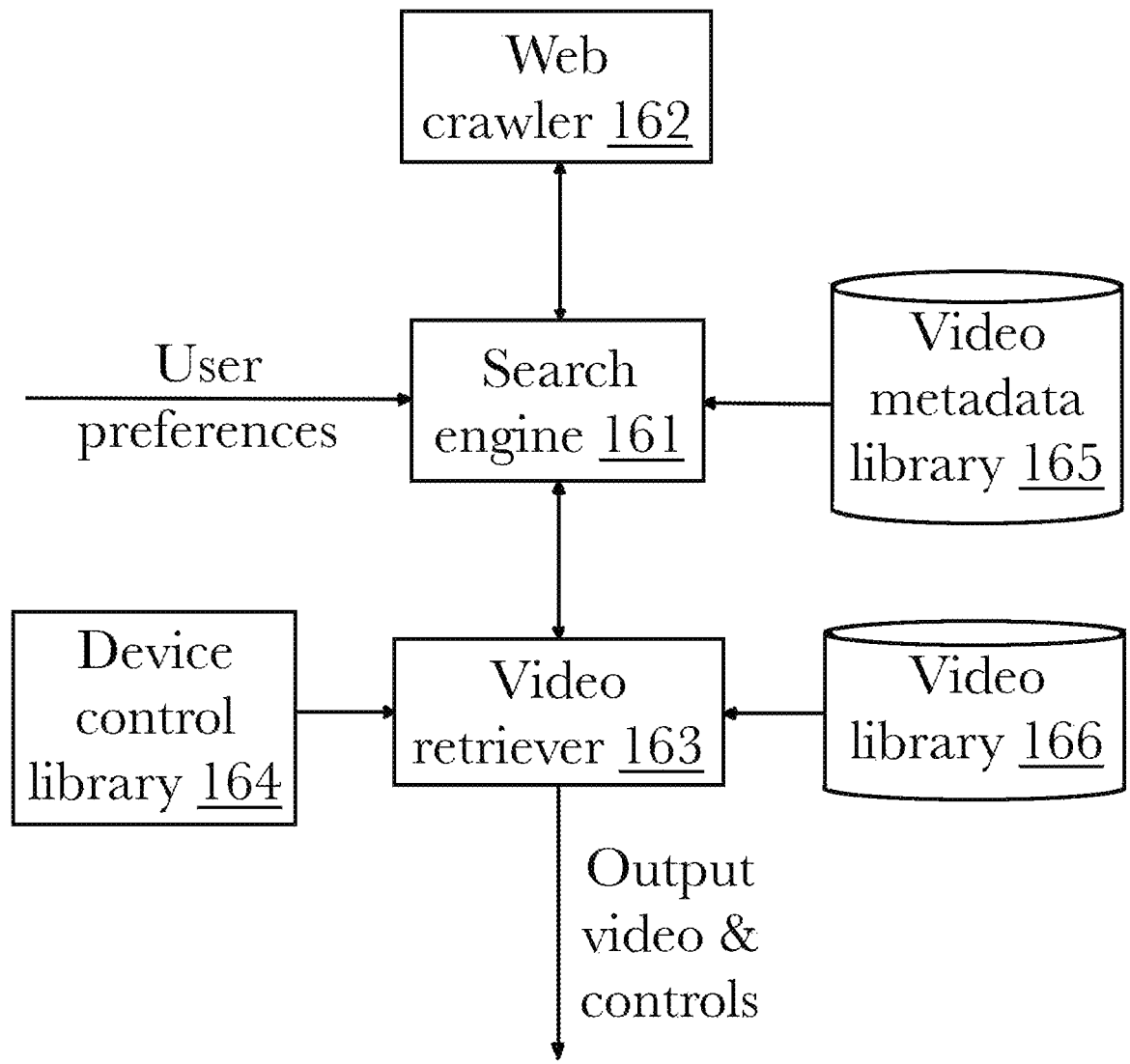
FIG. 3 shows additional components of a video selection engine, according to one aspect.

FIG. 3 shows additional components of a video selection engine 160, according to one aspect. According to the aspect, a search engine 161 may receive user preferences from a user portal 160, and utilize these preferences to direct the operation of a web crawler 162 to locate and retrieve media content over a network (such as content from online streaming service providers, or publicly-posted content on social networking sites). Search engine 161 may incorporate information from a video metadata library 165 to appropriately locate content in accordance with the user preferences received, searching for and retrieving contents based on whether it matches metadata specified in the preferences. A video retriever 163 may be used to retrieve stored content from a video library 166 (such as a local repository of content, for example paid content exclusive to platform subscribers), as well as loading information from a device control library 164 to properly direct any stimulation devices, before providing the retrieved media content (whether retrieved from video library 166 or online sources via web crawler 162) and device control information as video and control output.

FIG. 4 shows additional components of a community portal 120, according to one aspect. According to the aspect, a community portal 158 may be used to provide a trust or rating system 406 that may be used to manage user relationships and associations and provide the groundwork for a variety of shared user spaces such as a video sharing portal 401 for watching content with other users, an open group sharing area 402, a private session portal 405 for sharing experiences with specific users in a private setting, themed areas 404 that may provide experiences catering to specific topics or styles, and discussion boards or other social networking features 403.

Figure 7:
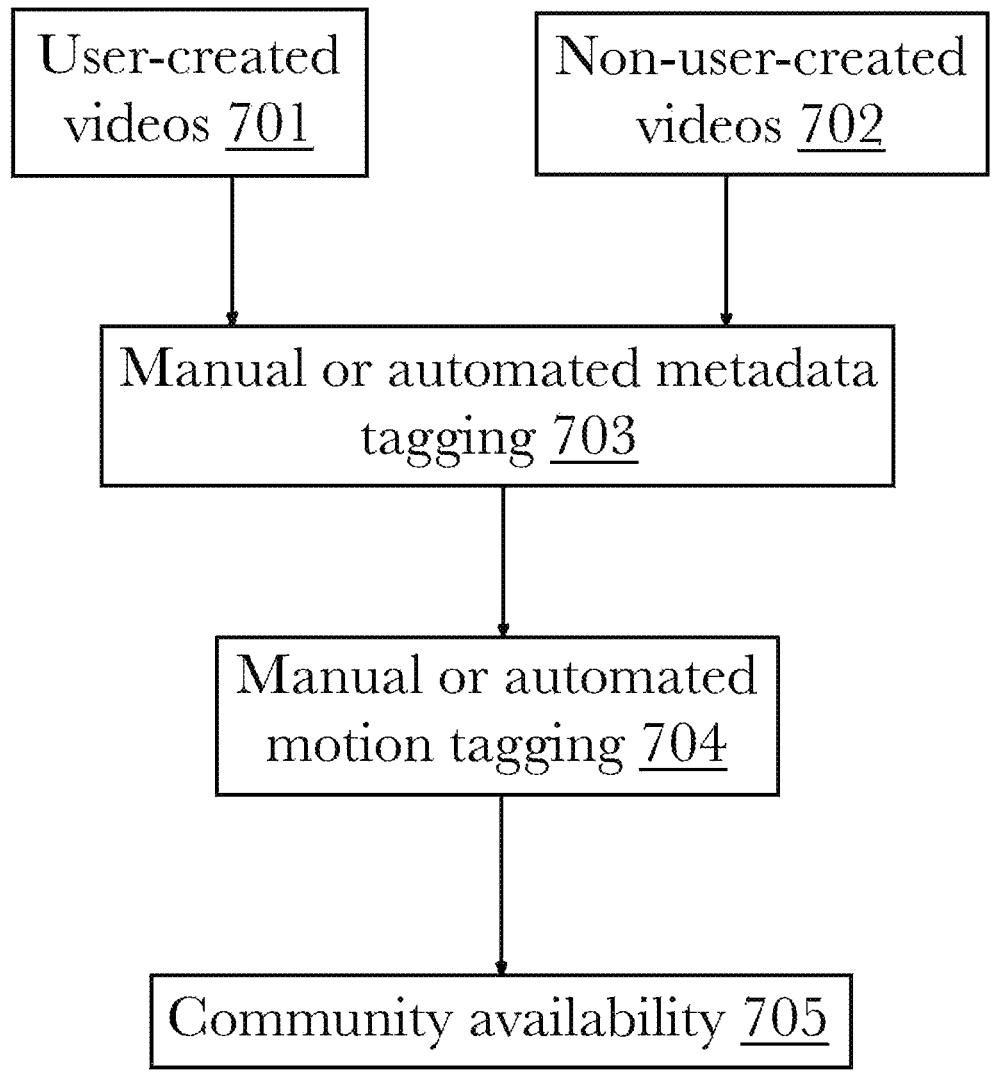
FIG. 7 shows additional components of a video sharing portal, according to one aspect.

FIG. 7 shows additional components of a video sharing portal 401, according to one aspect. According to the aspect, user-created videos 701 as well as non-user-created videos 702 (for example, paid content or streaming content from an online service provider or public content provider such as an online discussion board) may be retrieved and processed for metadata tagging 703. Tagging may occur manually, wherein a user selects metadata for association with a video, or automatically wherein AI is used to process the video and apply metadata tags based on analysis of the video details and content. The video may then be tagged with motion data 704, again either manually or automatically, comprising information on motions and activities taking place in the video that may be used to direct stimulation devices for replicating the actions happening in the video. Processed videos with metadata and motion tagging information associated with them may then be provided for community availability 705, enabling users to select them for group viewing and shared experiences.

Figure 8:
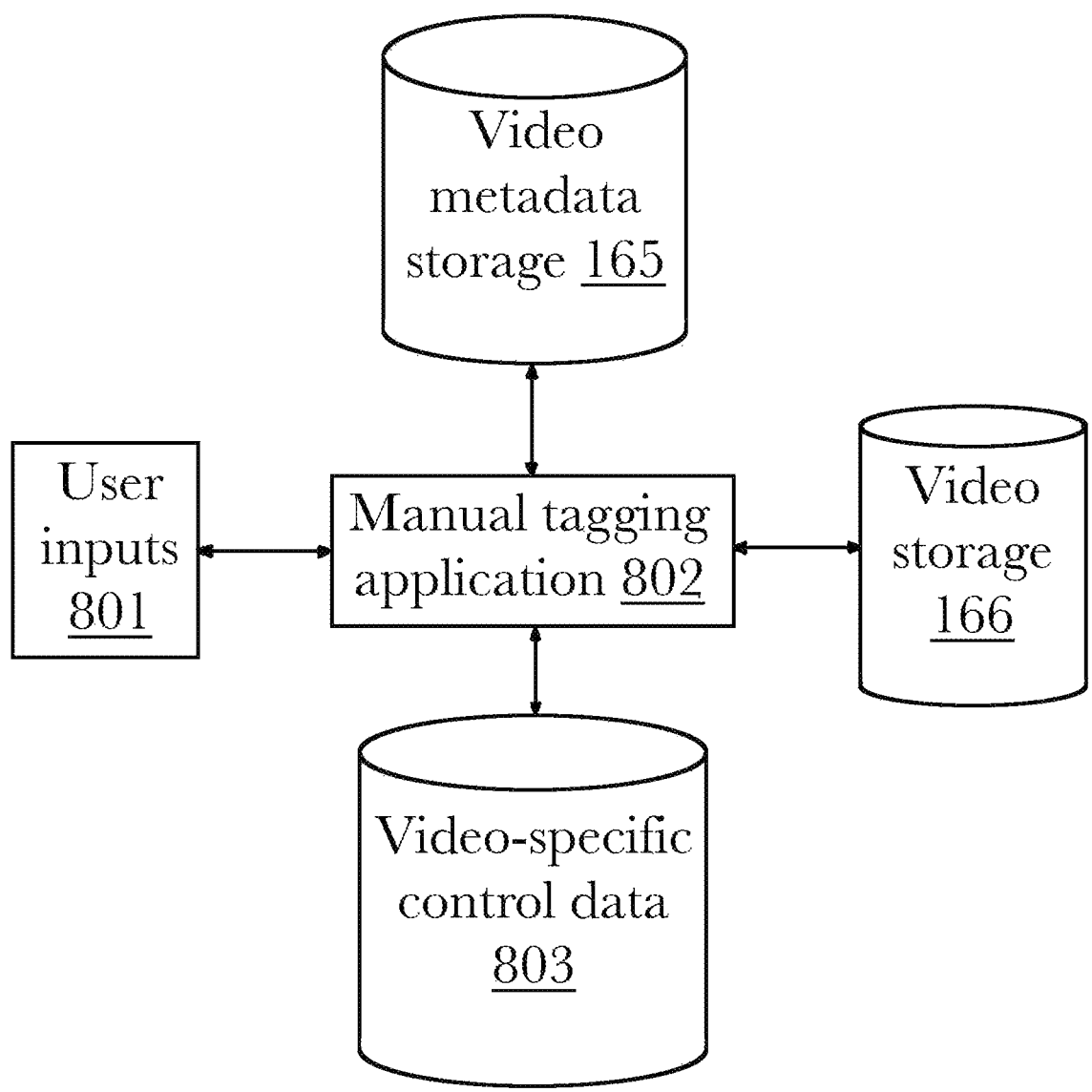
FIG. 8 shows additional components of a manual tagging system, according to one aspect.

FIG. 8 shows additional components of a manual tagging system 800, according to one aspect. According to the aspect, a manual tagging application 802 may be used to enable user input 801 to enable the user to manually associate metadata tags with videos, such as keywords and indicators that may be used to assist AI and other users in video selection and retrieval. Videos may be stored 166 separately from a metadata store 165, with associative links ensuring that when a video is retrieved the corresponding metadata is also retrieved while providing the benefits of distributed storage such as redundancy and decreased latency. Video-specific control data may also be stored 803, comprising control information for use in directing stimulation devices during viewing of a video and comprising information from motion tagging 704.

FIG. 9 shows additional components of a manual tagging application 900, according to one aspect. According to the aspect, a manual tagging application 900 may provide an interface for viewing a video 901 along with a plurality of controls such as interactive sliders 902 for manually indicating motion and activity in the video throughout playback (that is, motion inputs may be provided at any given point during playback, so that a continuous and changing stream of motion data is associated with the video as it plays). A data collector display 903 may collect and present metadata statistics such as motion intensity or number of tagged keywords at various points in a video, giving a user a clear indication of areas where further tagging may be needed as well as assisting the user with ensuring that motion and other metadata remains consistent relative to tagged data in the rest of the video (for example, so that the user does not accidentally cause sudden and jarring changes in the motion controls, instead referencing each data input on prior inputs).

Figure 10:
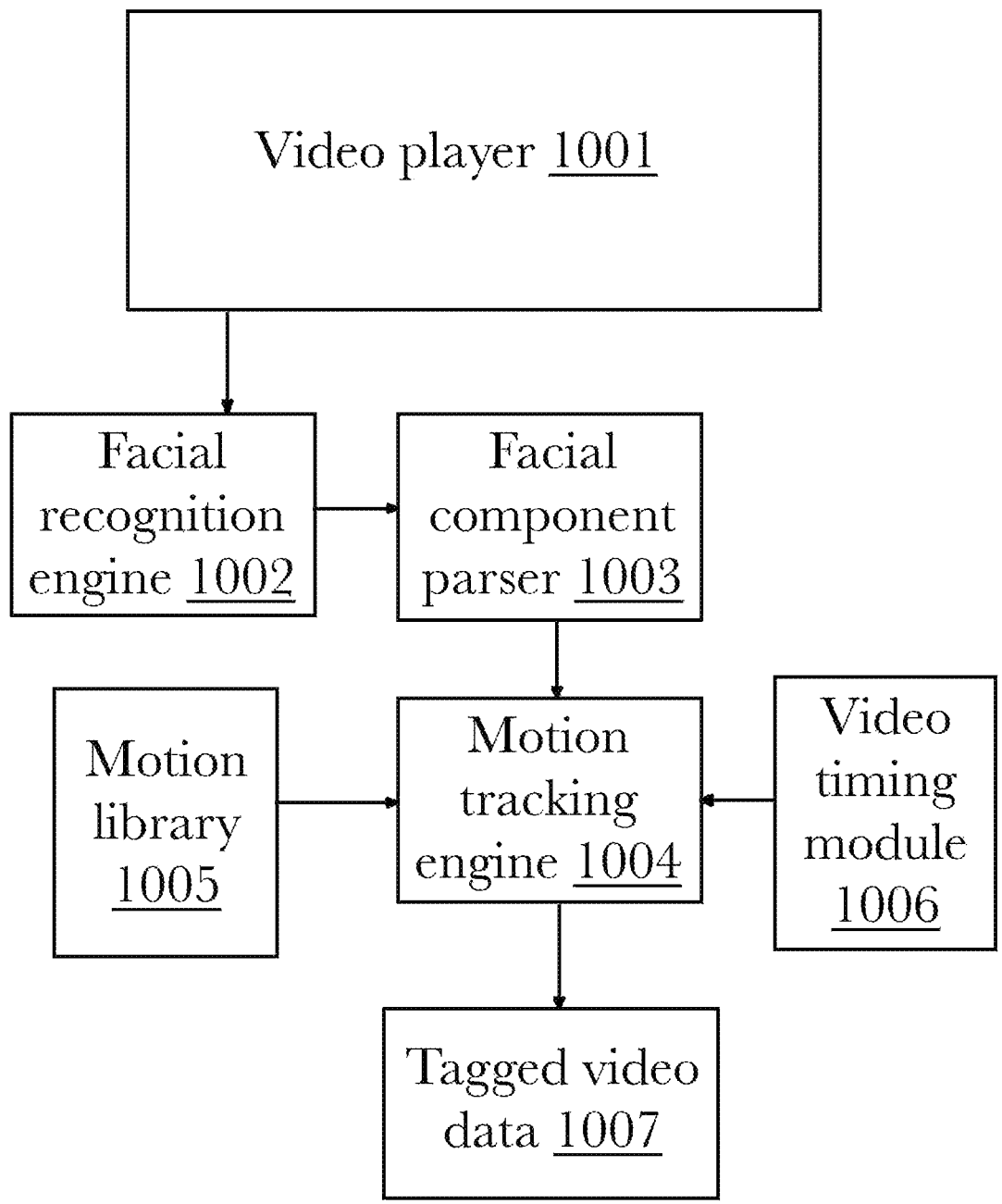
FIG. 10 shows additional components of an automated tagging engine, according to one aspect.

FIG. 10 shows additional components of an automated tagging engine 1000, according to one aspect. According to the aspect, AI-driven tagging may be used to augment or replace manual tagging, for example to provide a metadata baseline on all processed videos to which users may then choose to add manual tagging data. A video player 1001 may retrieve and load a video for processing, and a facial recognition engine 1002 may then analyze the video frames to identify faces and tag specific actors or other keywords based on the analysis, as well as to enforce privacy policies by (for example) obfuscating faces (such as by applying a blur to the face within each frame of a video) of some or all actors in a video. Facial component parser 1003 may be used for more fine-grained detail in tagging, for example discriminating between specific emotions or by identifying facial features such as eyes, lips, nose, etc. for use in motion tracking. A motion tracking engine 1004 may then analyze movement in the video to identify actions and motions that are occurring, loading reference data from a motion library 1005 to improve results and maintain consistency across videos and using a video timing module 1006 to ensure the tagged motion data closely matches the actions occurring in the video. Tagged video data 1007 may then be stored and provided as output for further use.

Figure 11:
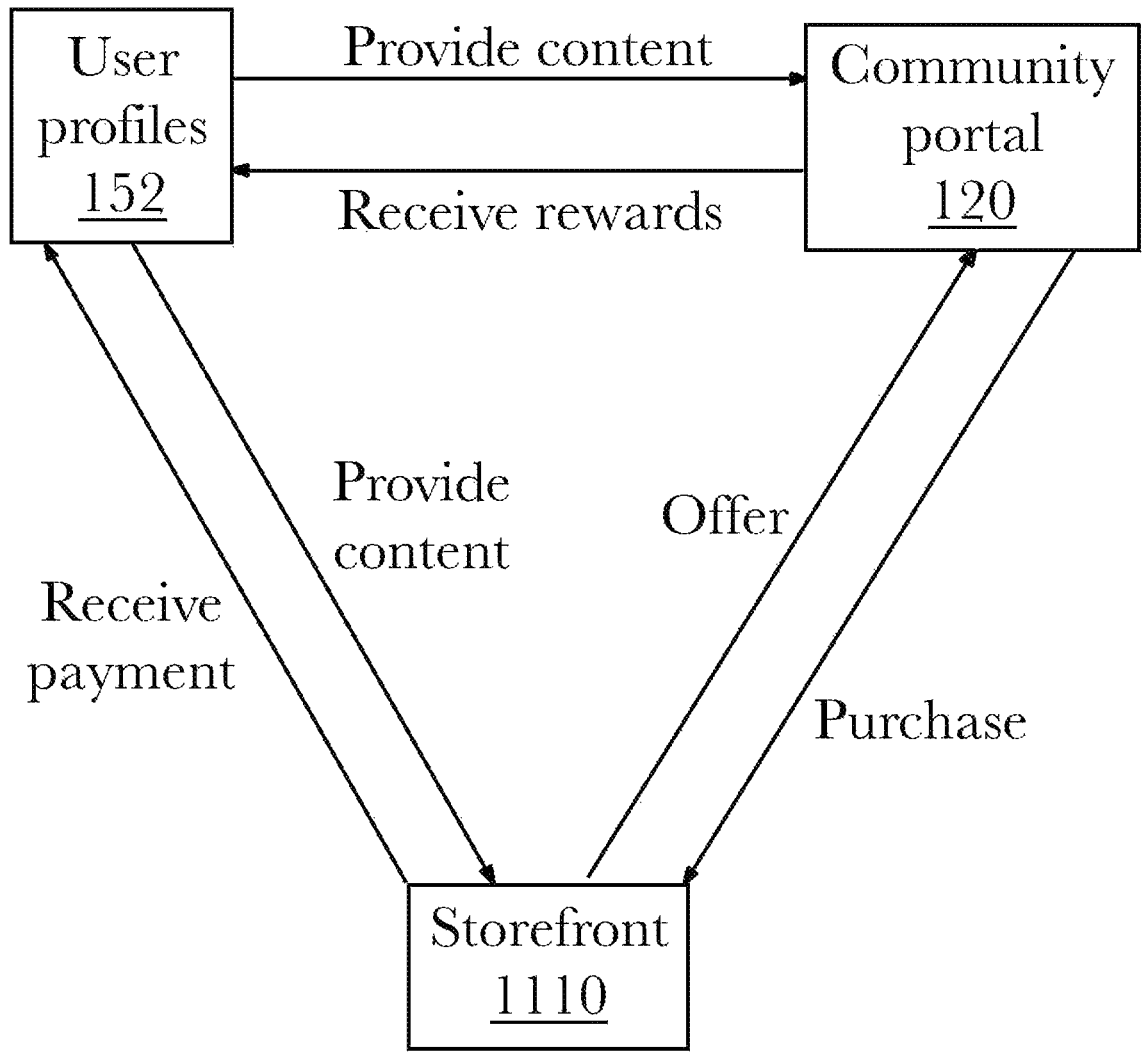
FIG. 11 shows additional components of a crowdsourcing system, according to one aspect.

FIG. 11 shows additional components of a crowdsourcing system 1100, according to one aspect. According to the aspect, crowdsourcing may comprise a closed-loop system for users to both produce and consume content, with a two-way flow of rewards and payments to provide a full virtualized marketplace. User profiles 152 may provide content to an online storefront 1110 for purchase (for example, to sell user-generated content or to sell services such as metadata or motion tagging for other videos), as well as to a community portal 120 for non-paid content. This enables users to build a portfolio of both free and paid content, while incentivizing both. Content in a community portal 120 may generate rewards for the user 152, either incentivizing an initial upload by giving reward points or tokens on a per-content basis, or providing rewards based on community engagement to incentivize content on a per-view basis. Paid content in a storefront 1110 may generate actual revenue in the form of received payments, optionally with the crowdsourcing platform receiving a portion to monetize user content. Users interacting via a community portal may be offered content from storefront 1110, and may purchase content from the community portal 120 directly (that is, without needing to be redirected to an external virtual marketplace).

Detailed Description of Exemplary Aspects

Figure 5:
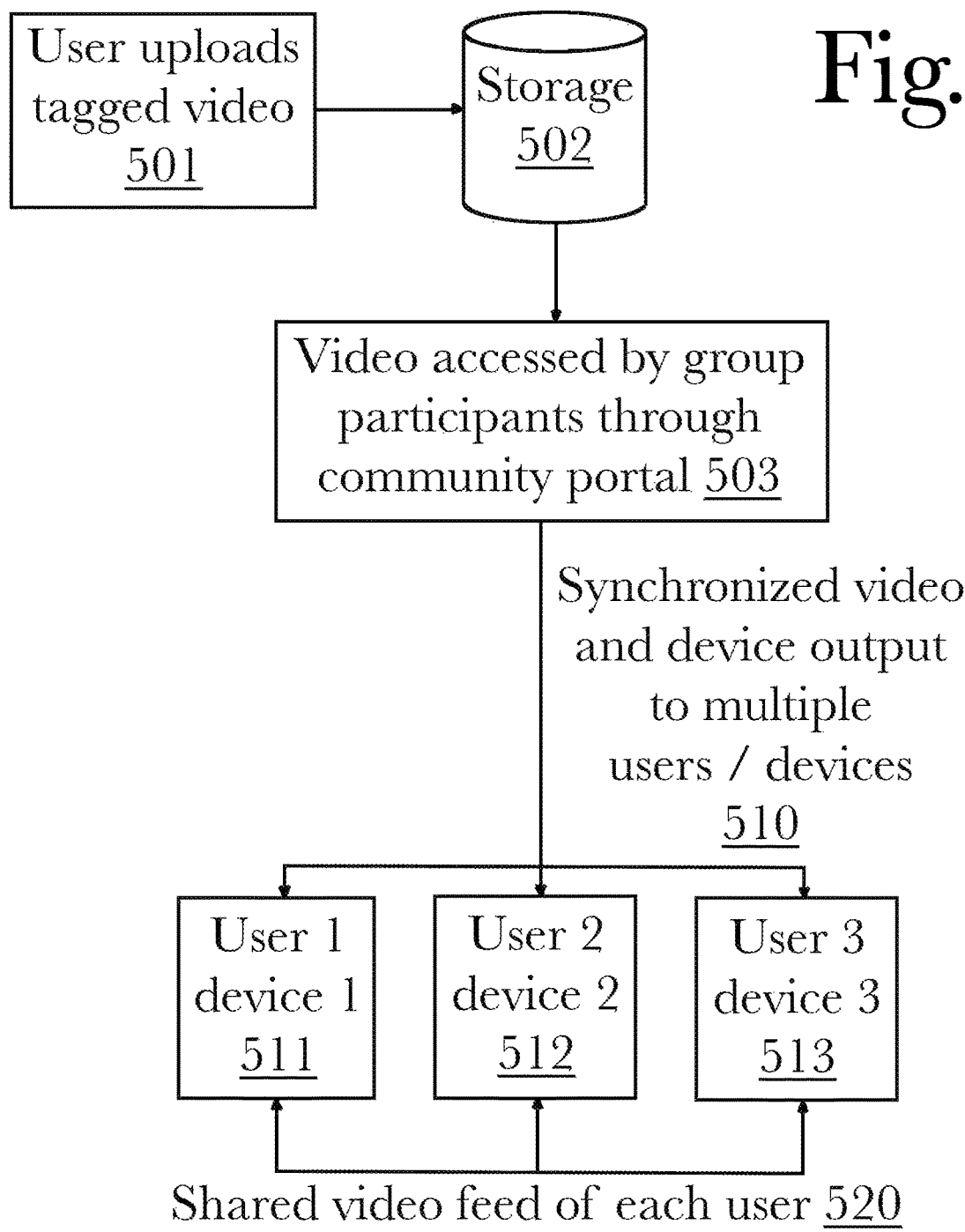
FIG. 5 shows an exemplary process flow for shared experience, according to one aspect.

FIG. 5 shows an exemplary process flow for shared experience 500, according to one aspect. According to the aspect, a user first uploads a tagged video 501 to storage 502, or otherwise selects or links to a tagged video 501 from storage 502, comprising both media content and metadata (the associated tags). From storage 502, this content may then be accessed 503 by group participants via a community portal 120 as described above. The video content may then be synchronized to each user's device 510, for simultaneous stimulation by each user on their respective devices 511, 512, 513 in synchronization with each other user. Users may also be provided a shared video feed 520, showing a video feed of each other participating user in a manner similar to videoconferencing calls, providing the shared experience of watching the video together and allowing for visual or auditory interaction between users during the shared experience.

Figure 6:
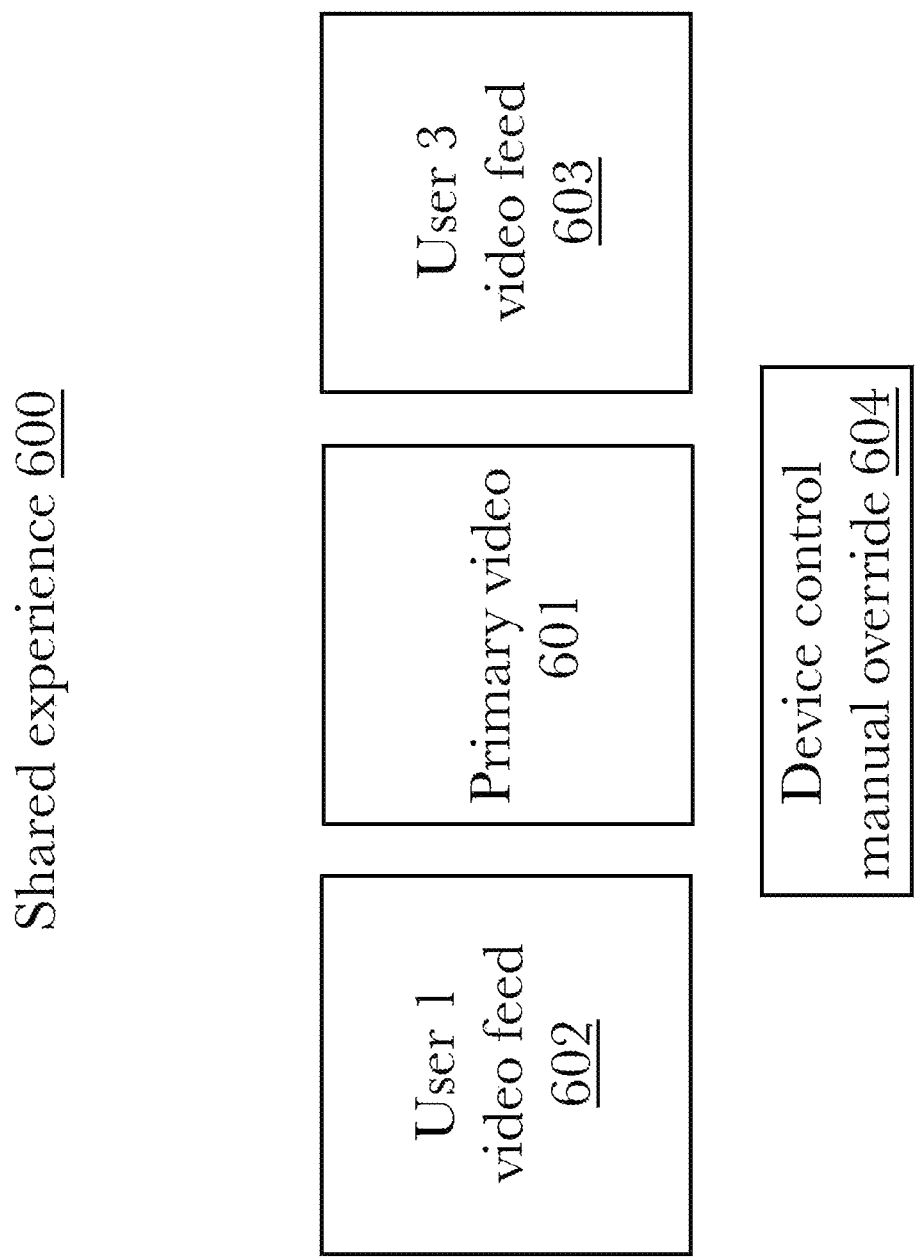
FIG. 6 is an illustration of an exemplary shared experience user interface, according to one aspect.

FIG. 6 is an illustration of an exemplary shared experience user interface 600, according to one aspect. According to the aspect, a user interface for a shared experience 600 may show a given user a display of the media content selected for viewing 601, as well as video feeds of other participating users 602, 603, providing for user interaction as well as the simulation of a shared, group viewing experience. A user may also be shown a manual device control override 604, enabling them to take manual control of any stimulation devices in use rather than allowing AI-driven operation to direct them during the experience (as described below).

Figure 12:
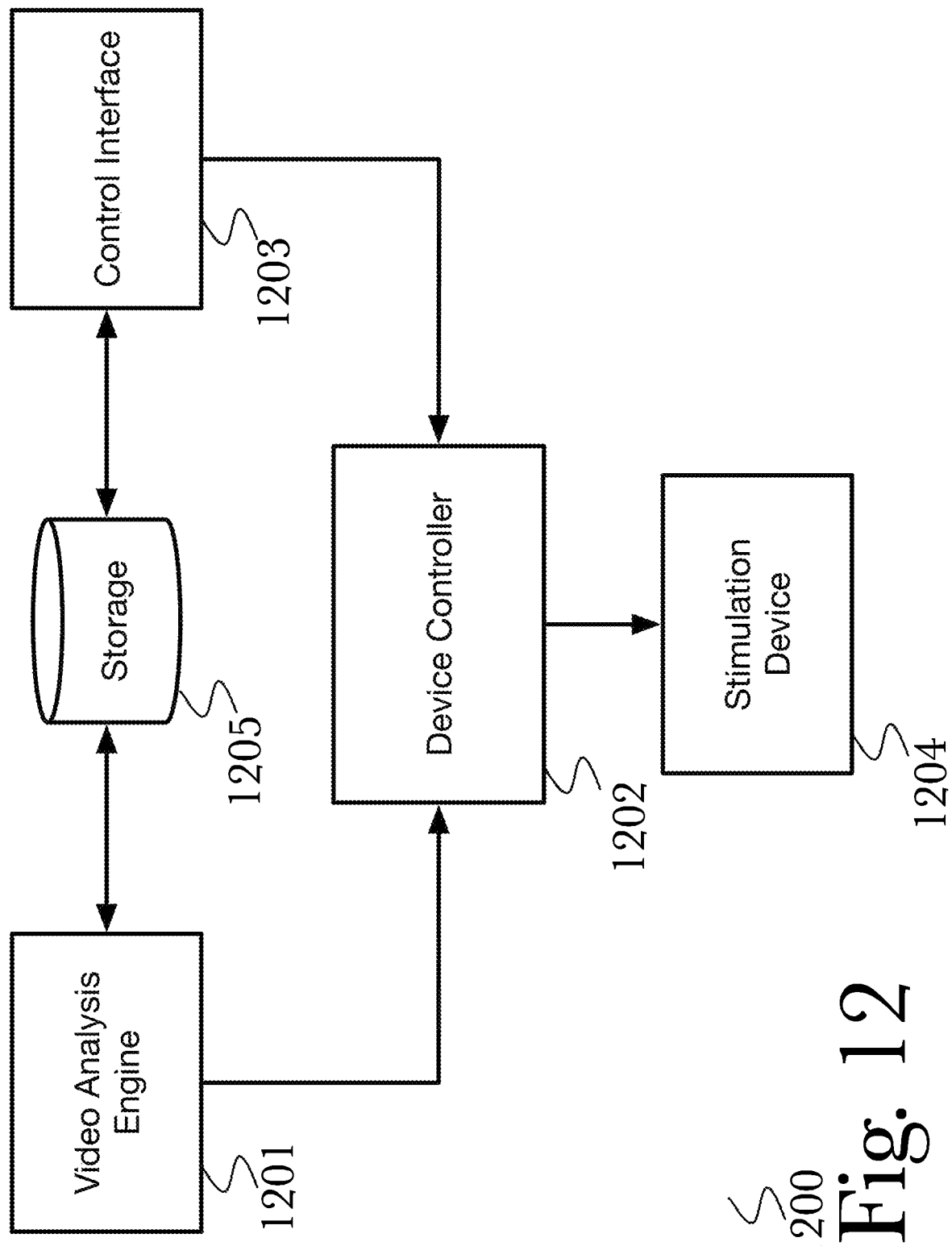
FIG. 12 is a block diagram of an exemplary synchronized video control system for sexual stimulation devices according to an embodiment.

FIG. 12 is a block diagram of an exemplary synchronized video control system for sexual stimulation devices 1200 according to a preferred embodiment. In this embodiment, a video analysis engine 1201 inputs a video of sexual activity, parses the video into at least the components of movement corresponding to the sexual activity shown in the video, and outputs signals containing the parsed video information to a device controller 1202. A user interface 1203 allows the user to enter a profile containing at least his preferences regarding the video content that he prefers, stores the user's profile information, and outputs the user's profile information to the device controller 1202. The device controller 1202 adjusts the signals from the video analysis engine 1201 based on the profile information from the user interface 1203 and outputs the adjusted signals to a stimulation device 1204 such that they are synchronized with the activity shown in the video. In an aspect of an embodiment, the parsed video information from the video analysis engine 1201 is stored in a data storage device 1205 for later retrieval and use.

Figure 13:
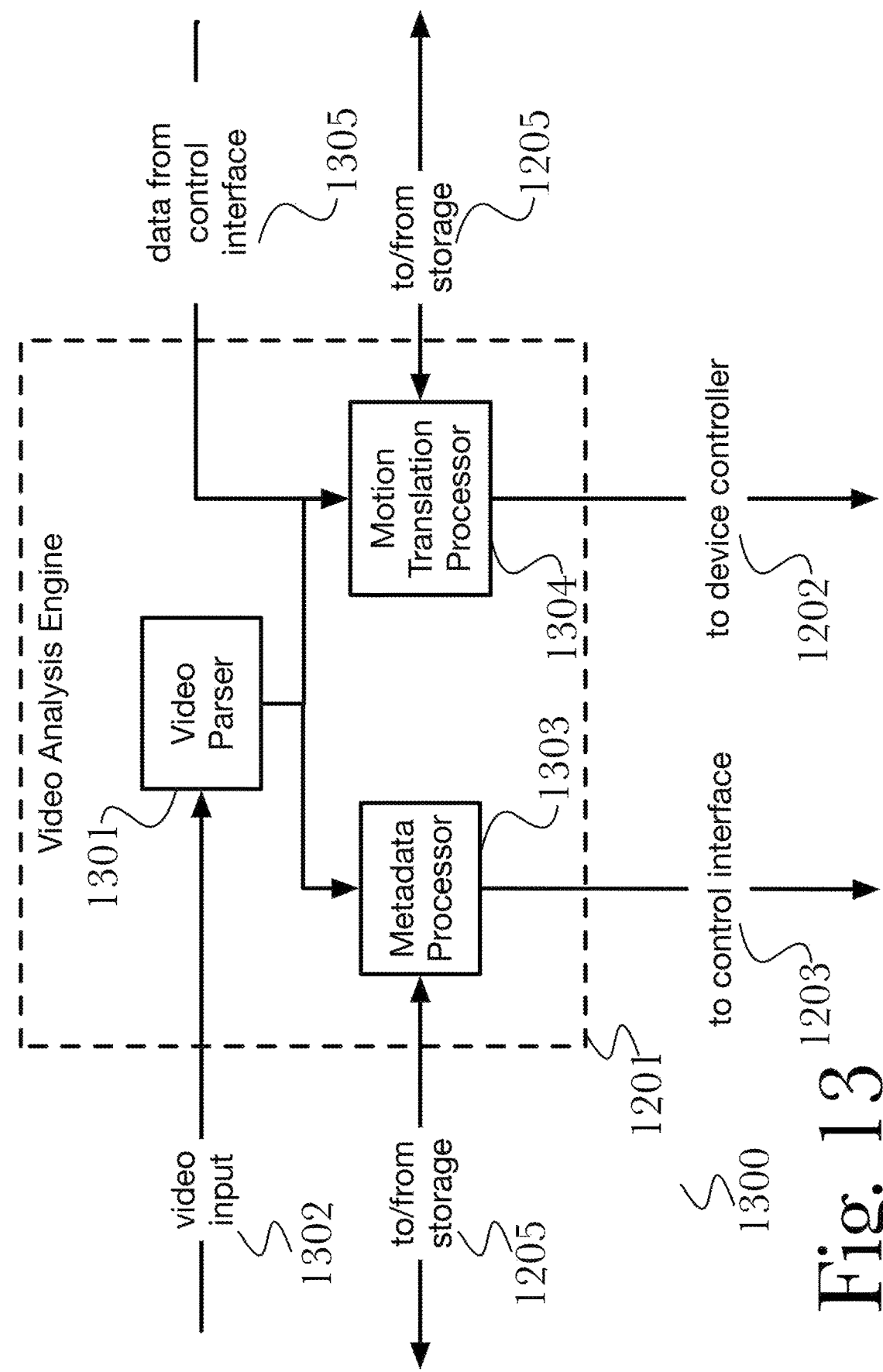
FIG. 13 is a block diagram of the video analysis engine aspect of an exemplary synchronized video control system for sexual stimulation devices according to an embodiment.

FIG. 13 is a block diagram 1300 the video analysis engine 1201 aspect of an exemplary synchronized video control system for sexual stimulation devices according to a preferred embodiment. A video parser 1301 receives video input 1302, sends the video's metadata to a metadata processor 1303, which checks to see if the metadata for that video already exists in the data storage device 1205. If the metadata already exists, it is read from the data storage device 1205 and sent out the user interface 1203. If the metadata does not exist, it is formatted, written to the data storage device 1205, and sent out to the user interface 1203. Simultaneously, the video parser 1302 sends the video content to the motion translation processor 1304, which checks to see if the control signal data for that video already exists in the data storage device 1205, and incorporates data from the control interface 1305. If the control signal data already exists, it is read from the data storage device 1205 and sent out the device controller 1202. If the control signals do not exist, the motion translation processor 1304 uses video processing algorithms and machine learning algorithms to detect sexual activity and to translate the motions in the video to control signals related to movement, pressure, and rhythm. The controls signals are then written to the data storage device 1205 and sent out to the device controller 1202. In an aspect of an embodiment, the actual video content may also be stored in the data storage device 1205.

Figure 14:
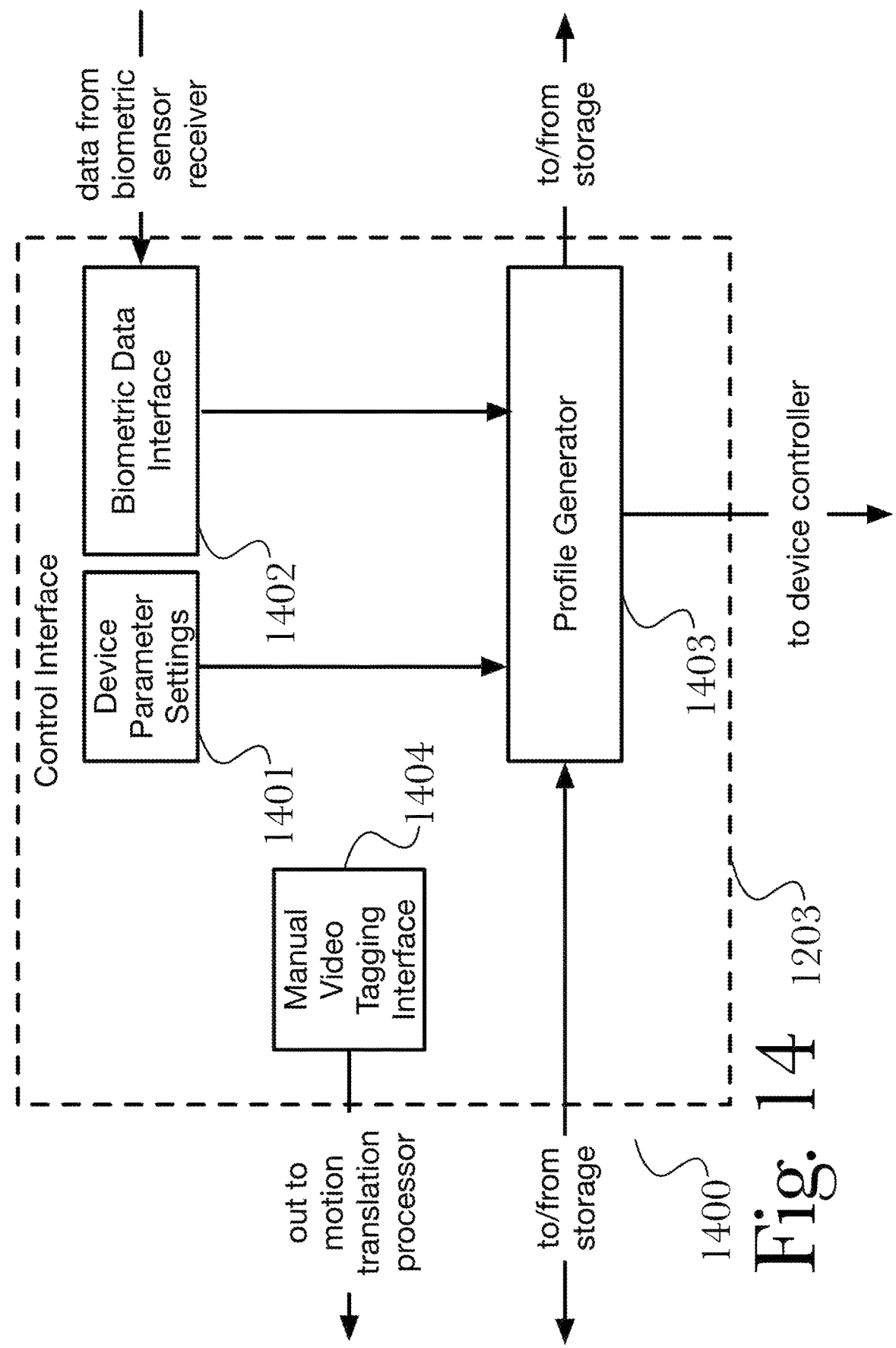
FIG. 14 is a block diagram of the control interface aspect of an exemplary synchronized video control system for sexual stimulation devices according to an embodiment.

FIG. 14 is a block diagram 1400 of the user interface 1203 aspect of an exemplary synchronized video control system for sexual stimulation devices according to a preferred embodiment. Through the video preference interface 1401, the user can either select videos manually, or enter preferences regarding the types of video content he prefers based on metadata associated with the videos. The user can further enter biometric data manually, or it may be obtained automatically by the biometric data interface 1402 from biometric sensor receiver 1504 disclosed in FIG. 15. The biometric data is sent to a penile size conversion calculator 1403, which makes adjustments to output signals to provide a similar experience to the user regardless of penis size. The video preferences, biometric data, and penile size conversions are sent to a profile generator 1404, which creates a profile for the user based on the various inputs. The profile information is saved to the storage device 1205, and is sent to the device controller 1202. The user interface may contain a manual video tagging interface 1405, which allows the user to adjust the sensations received while viewing those videos. The user interface may also contain a video sharing portal 1406 that allows for the storage and sharing of a library of analyzed videos such that users can further customize their experiences by, for example, selecting certain experiences based on their video preferences, sharing personalized experiences by sharing their own videos, sharing user profiles, or sharing customized parsing of certain videos.

Figure 15:
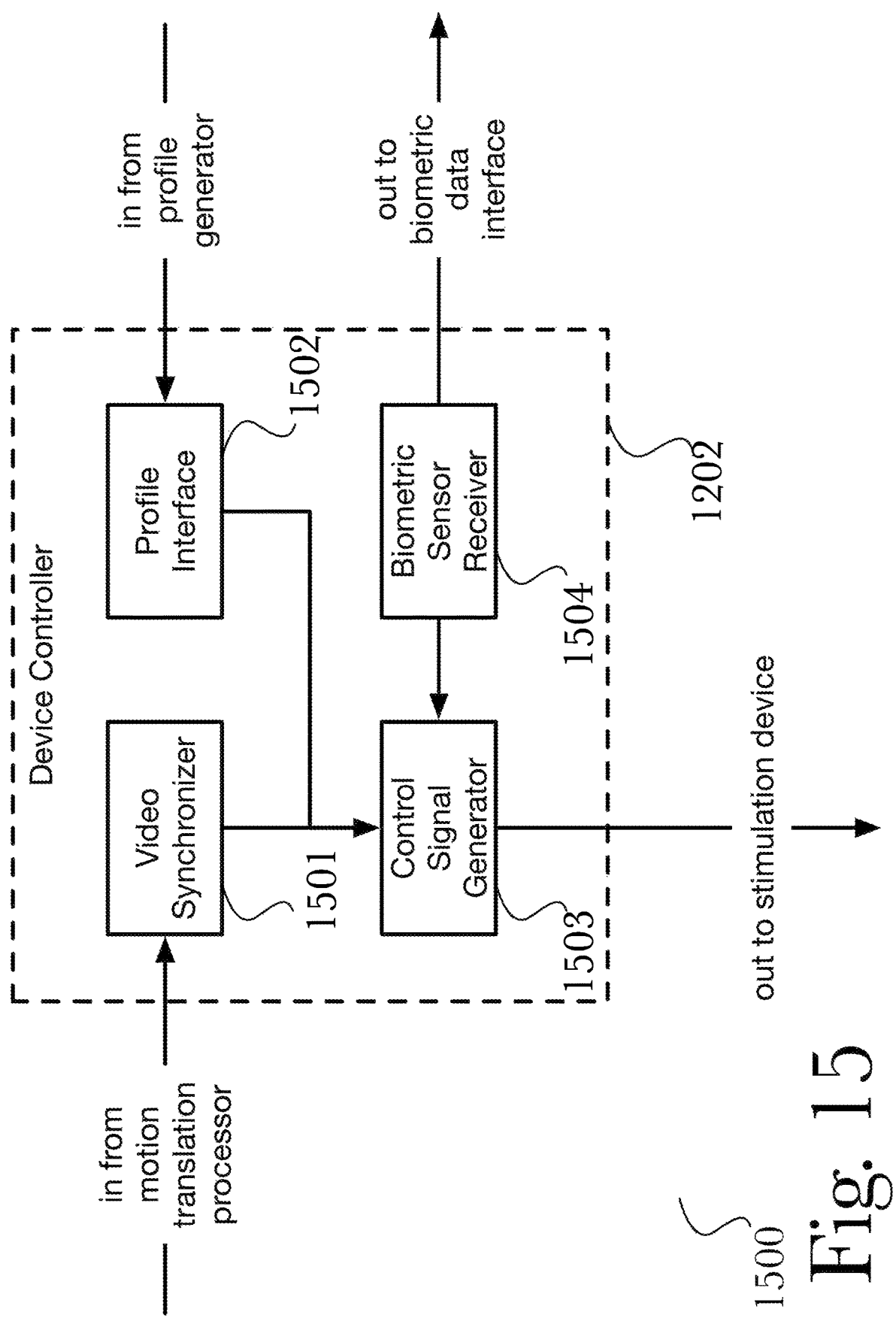
FIG. 15 is a block diagram of the device controller aspect of an exemplary synchronized video control system for sexual stimulation devices according to an embodiment.

FIG. 15 is a block diagram 1500 of the device controller 1202 aspect of an exemplary synchronized video control system for sexual stimulation devices according to a preferred embodiment. Control signals for the video being watched are received from the motion translation processor 1304 into the video synchronizer 1501, which adjusts the timing of the signals to correspond with the video being watched. Biometric and preference data is received into the profile interface 1502 from the profile generator 1404. A control signal generator 1503 receives the outputs from both the video synchronizer 1501 and profile interface 1502, and adjusts the synchronized control signals based on the biometric and preference data, and sends out the adjusted control signal to the stimulation device 1204. The device controller may also contain a biometric sensor receiver 1504 that could allow the capture of biometric data from wireless devices such as fitness trackers that monitor heart rate, blood pressure and breathing monitors, and even a penile stiffness sensor in the stimulation device itself. The data captured through the biometric sensor receiver could be used for real time feedback to the control signal generator 1503 and for use in improving user experiences by enhancing the user's profile or improving the accuracy of video selection.

Figure 16:
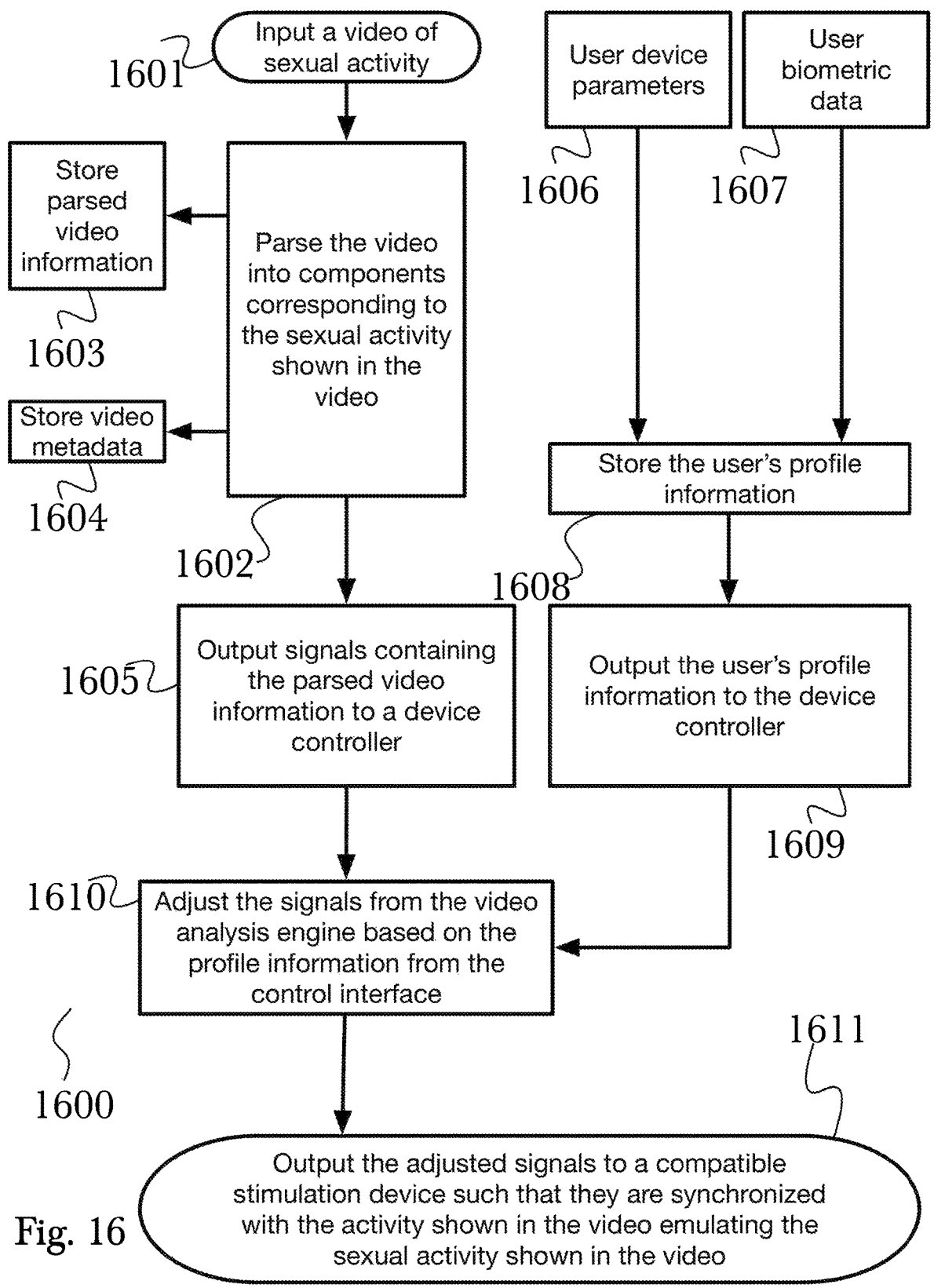
FIG. 16 is a flow diagram showing a method for an exemplary synchronized video control system for sexual stimulation devices according to an embodiment.

FIG. 16 is a flow diagram showing a method 1600 for an exemplary synchronized video control system for sexual stimulation devices according to a preferred embodiment. According to this method, video of sexual activity would be input into a computer 1601. The computer, using machine learning algorithms, would parse the video into at least the components of movement corresponding to the sexual activity shown in the video 1602. The parsed video information is stored 1603, and the video metadata is also stored 1604. The parsed video information is simultaneously converted to device control signals and output to a device controller 1605. Separately, information about the user device parameters 1606 may be entered manually or captured by querying the device itself. Biometric data 1607 may also be entered manually or captured from wireless devices such as fitness trackers that monitor heart rate, blood pressure and breathing monitors, and even a penile stiffness sensor in the stimulation device itself. The device parameters 1606 and biometric data 1607 are stored as part of the user's profile information 1608, and then output to a device controller 1609. The output signals from the parsed video information 1605 are adjusted 1610 based on the output from the profile information 1609, and output to a stimulation device such that they are synchronized with the activity shown in the video such that a stimulation device capable of receiving the signals from the device controller and translating the signals into sexual stimulation would emulate the sexual activity shown in the video 1611. In some embodiments, the user may also share with other users his or her user profile, personalized experiences by sharing his own videos, or customized parsing of certain videos.

Figure 21:
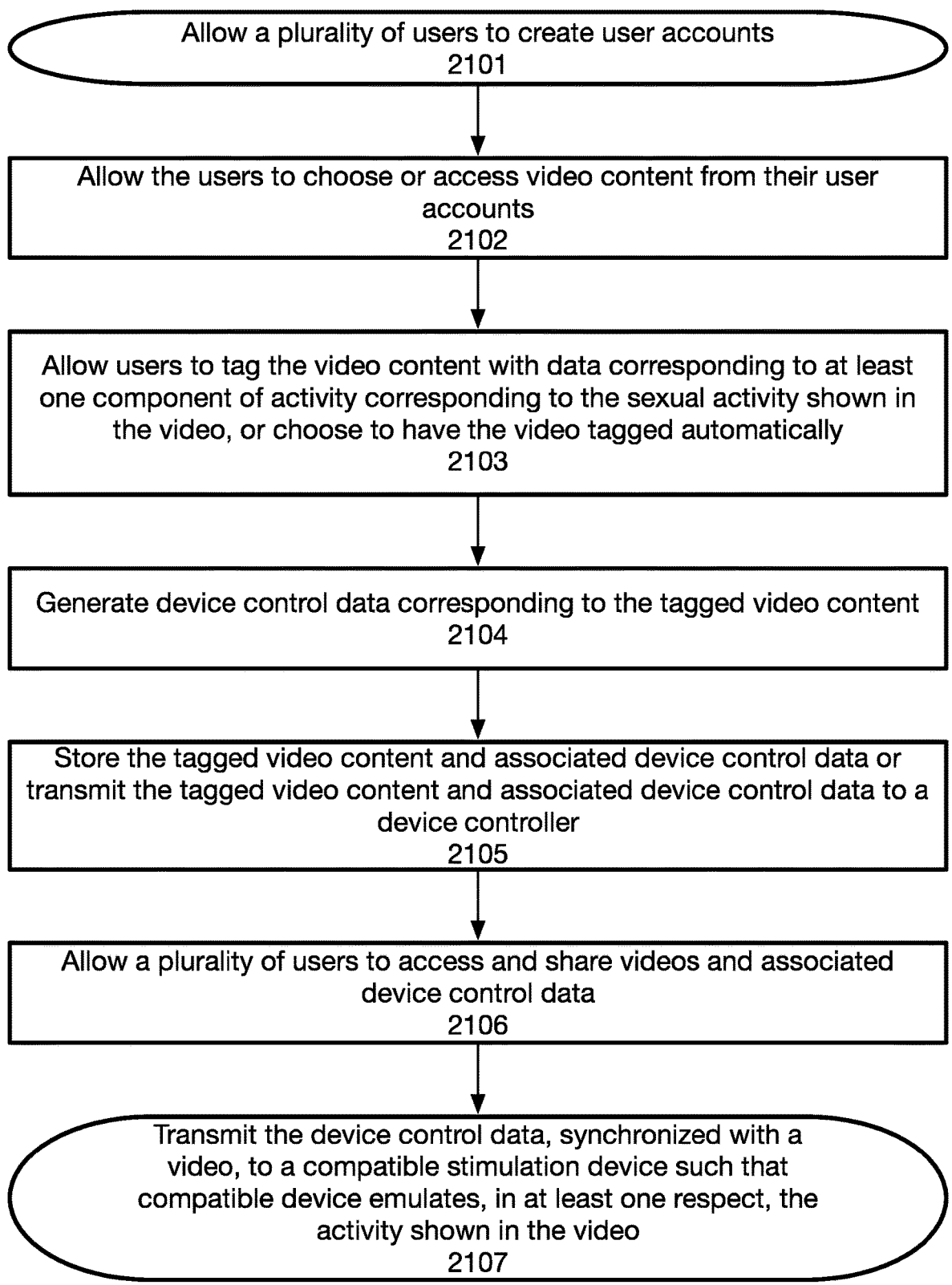
FIG. 21 is a flow diagram illustrating an exemplary method for a synchronized video control system for sexual stimulation devices.

FIG. 21 is a flow diagram illustrating an exemplary method for a synchronized video control system for sexual stimulation devices, comprising the steps of: allowing a plurality of users to create user accounts 2101, allowing the users to choose or access video content from their user accounts 2102, allowing users to tag the video content with data corresponding to at least one component of activity corresponding to the sexual activity shown in the video, or choose to have the video tagged automatically 2103, generating device control data corresponding to the tagged video content 2104, Store the tagged video content and associated device control data or transmit the tagged video content and associated device control data to a device controller 2105, allowing a plurality of users to access and share videos and associated device control data 2106, and transmitting the device control data, synchronized with a video, to a compatible stimulation device such that compatible device emulates, in at least one respect, the activity shown in the video 2107.

Figure 22:
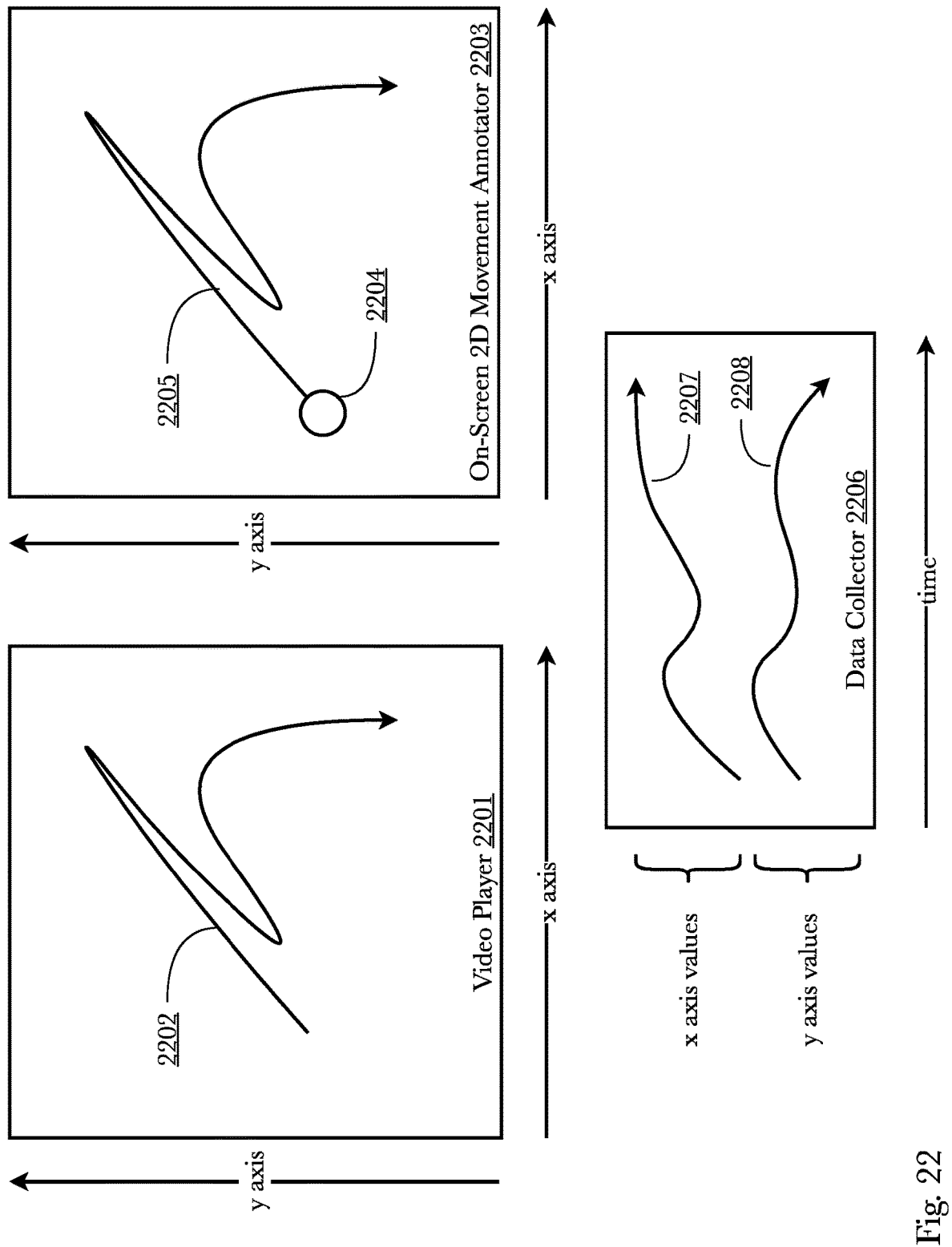
FIG. 22 is a diagram showing an exemplary motion input system for two-dimensional video motions.

FIG. 22 is a diagram showing an exemplary motion input system for two-dimensional video motions. In this embodiment, the motion input system comprises an on-screen 2D movement annotator 2203 further comprising a movement icon 2204, which can be moved on the screen along both an x-axis and a y-axis. As a video player application 2201 on a computer displays a video on the computer screen, a user grabs the movement icon 2204 using an input device such as a computer mouse. As the user identifies a two-dimensional movement in the video 2202, the user mimics the two dimensional motion with the input device, which causes the movement icon 2204 to move in the same pattern 2205 in the on-screen 2D movement annotator 2203. The x-axis and y-axis location of the movement icon 2204 are tracked by a data collector 2206, which records the x-axis values 2207 and y-axis values 2208 separately over time, associating each x-axis and y-axis value with a playback time in the video. In a preferred embodiment, the on-screen 2D movement annotator 2203 is incorporated into, or overlaid onto, the video player 2201, such that the movement icon 2204 is displayed on top of the video being played, such that the user tracks the motion in the video by keeping the movement icon 2204 on top of the object in the video that is moving. Many forms of two-dimensional input devices may be used, including computer mouses, joysticks, pressure-sensitive tablets, or capacitance-sensitive touchscreens.

While this example shows tracking of movement in x and y axes, in other embodiments, the axes of movement can be changed, wherein the movements represent the x and z axes instead of the x and y axes. For example, where a motion on screen shows movement in the z axis (into and out of the screen) a forward and backward motion of a computer mouse on a horizontal surface could represent movement in the z axis and a sideways motion of the computer mouse could represent motion in the x axis. In some embodiments, a combination of devices can be used to track motion in three dimensions. In other embodiments, a single device can be configured to track motion in three dimensions. For example, a combination of accelerometers and/or gyroscopes can be configured in an input device to track motion in three dimensions. As another example, cameras, ultrasonic sensors, lasers, or other types of devices can be used to identify the position of an object (e.g., a hand) in three dimensional space.

Figure 23:
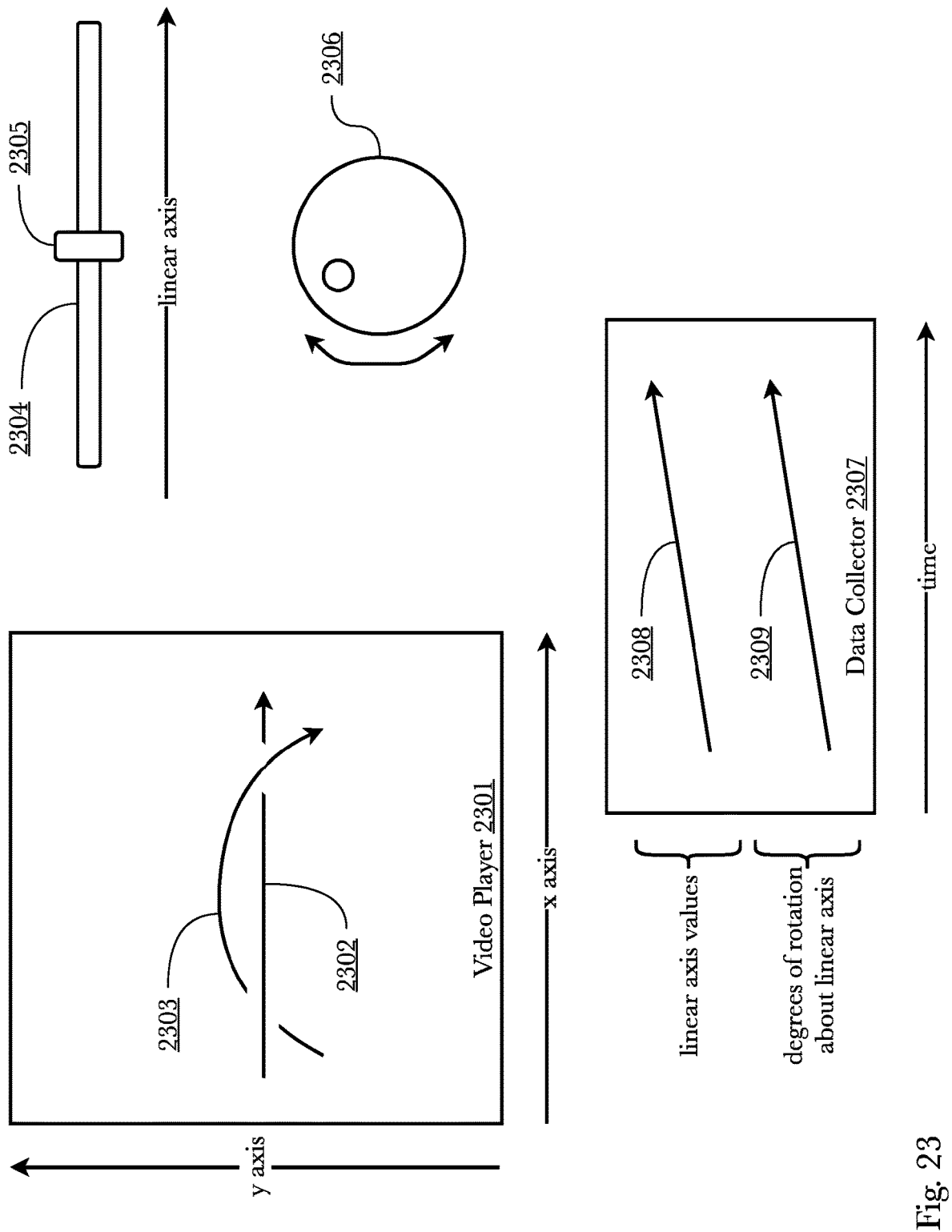
FIG. 23 is a diagram showing an exemplary motion input system for one-dimensional video motions with rotation.

FIG. 23 is a diagram showing an exemplary motion input system for one-dimensional video motions with rotation. In this embodiment, the motion input system comprises a slider 2304 with a slider icon 2305 for linear motion input and an on-screen dial 2306 for indicating rotation. As a video player application 2301 on a computer displays a video on the computer screen, a user grabs the slider icon 2305 using an input device such as a computer mouse. As the user identifies an object in the video moving in a linear motion 2302 and rotating about the linear axis 2303, the user mimics the linear motion 2302 with the input device, which causes the slider icon 2305 to move in the same pattern as the linear motion 2302. Simultaneously, the user indicates the degree of rotation by rotating the dial 2306 to correspond to the rotation 2303 about the linear axis 2302. The location of the slider icon 2305 and the rotation of the dial 2306 are tracked by a data collector 2307, which records the slider values 2308 and rotational values 2309 separately over time, associating each slider and rotational value with a playback time in the video. In a preferred embodiment, a movement icon 2204 such as that shown in FIG. 22 is incorporated into, or overlaid onto, the video player 2301, such that the movement icon 2204 is displayed on top of the video being played, such that the user tracks the motion in the video by keeping the movement icon 2204 on top of the object in the video that is moving. Many forms of two-dimensional input devices may be used, including computer mouses, joysticks, pressure-sensitive tablets, or capacitance-sensitive touchscreens. In the case of the dial 2306, a physical dial input device may be used to indicate the degree of rotation instead or, or in addition to, the on-screen dial 2306.

While this example shows tracking of movement in x and y axes, in other embodiments, the axes of movement can be changed, wherein the movements represent the x and z axes instead of the x and y axes. For example, where a motion on screen shows movement in the z axis (into and out of the screen) a forward and backward motion of a computer mouse on a horizontal surface could represent movement in the z axis and a sideways motion of the computer mouse could represent motion in the x axis. In some embodiments, a combination of devices can be used to track motion in three dimensions. In other embodiments, a single device can be configured to track motion in three dimensions. For example, a combination of accelerometers and/or gyroscopes can be configured in an input device to track motion in three dimensions. As another example, cameras, ultrasonic sensors, lasers, or other types of devices can be used to identify the position of an object (e.g., a hand) in three dimensional space.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the aspects disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific aspects, at least some of the features or functionalities of the various aspects disclosed herein may be implemented on one or more general-purpose computers associated with one or more networks, such as for example an end-user computing device, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some aspects, at least some of the features or functionalities of the various aspects disclosed herein may be implemented in one or more virtualized computing environments (e.g., network computing clouds, virtual machines hosted on one or more physical computing machines, or other appropriate virtual environments).

Figure 17:
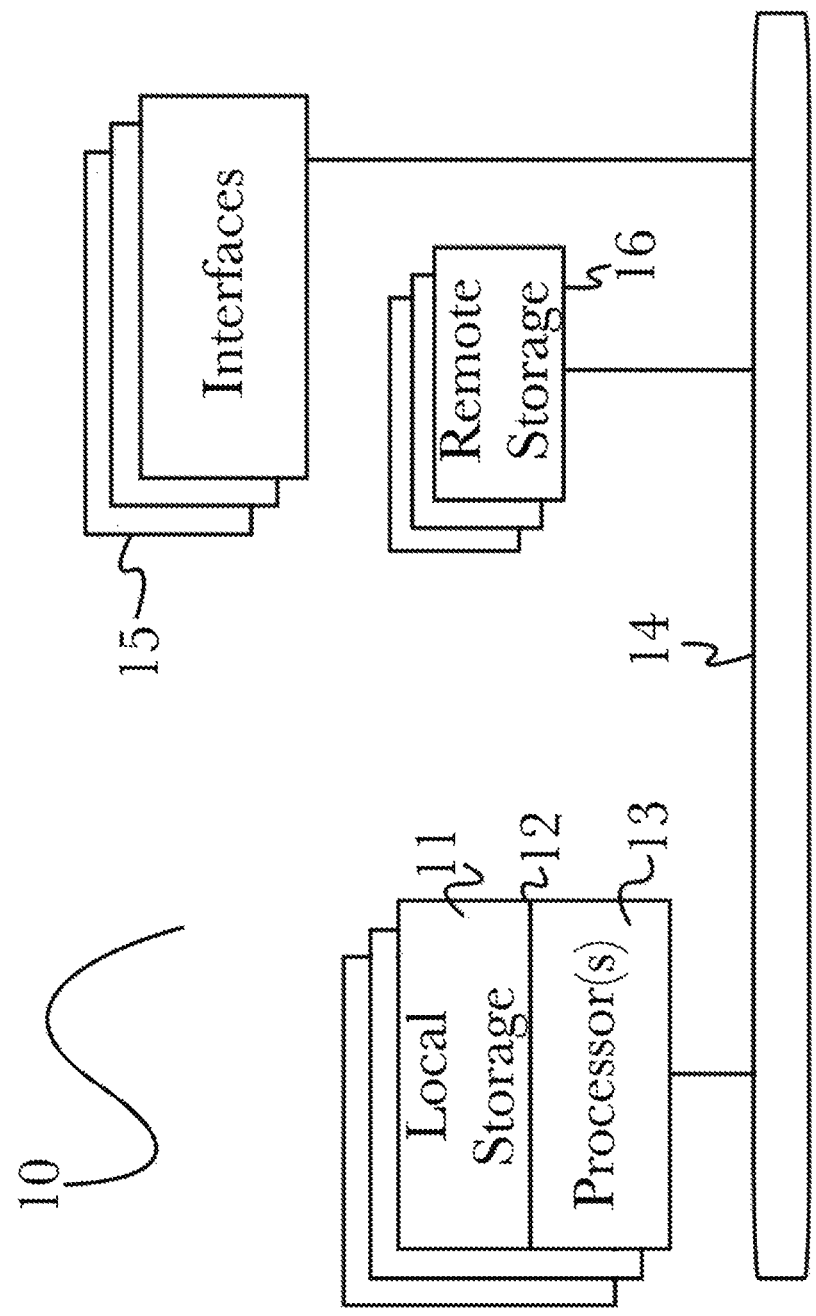
FIG. 17 is a block diagram illustrating an exemplary hardware architecture of a computing device.

Referring now to FIG. 17, there is shown a block diagram depicting an exemplary computing device 10 suitable for implementing at least a portion of the features or functionalities disclosed herein. Computing device 10 may be, for example, any one of the computing machines listed in the previous paragraph, or indeed any other electronic device capable of executing software- or hardware-based instructions according to one or more programs stored in memory.

Computing device 10 may be configured to communicate with a plurality of other computing devices, such as clients or servers, over communications networks such as a wide area network a metropolitan area network, a local area network, a wireless network, the Internet, or any other network, using known protocols for such communication, whether wireless or wired.

In one aspect, computing device 10 includes one or more central processing units (CPU) 12, one or more interfaces 15, and one or more busses 14 (such as a peripheral component interconnect (PCI) bus). When acting under the control of appropriate software or firmware, CPU 12 may be responsible for implementing specific functions associated with the functions of a specifically configured computing device or machine. For example, in at least one aspect, a computing device 10 may be configured or designed to function as a server system utilizing CPU 12, local memory 11 and/or remote memory 16, and interface(s) 15. In at least one aspect, CPU 12 may be caused to perform one or more of the different types of functions and/or operations under the control of software modules or components, which for example, may include an operating system and any appropriate applications software, drivers, and the like.

CPU 12 may include one or more processors 13 such as, for example, a processor from one of the Intel, ARM, Qualcomm, and AMD families of microprocessors. In some aspects, processors 13 may include specially designed hardware such as application-specific integrated circuits (ASICs), electrically erasable programmable read-only memories (EEPROMs), field-programmable gate arrays (FPGAs), and so forth, for controlling operations of computing device 10. In a particular aspect, a local memory 11 (such as non-volatile random access memory (RAM) and/or read-only memory (ROM), including for example one or more levels of cached memory) may also form part of CPU 12. However, there are many different ways in which memory may be coupled to system 10. Memory 11 may be used for a variety of purposes such as, for example, caching and/or storing data, programming instructions, and the like. It should be further appreciated that CPU 12 may be one of a variety of system-on-a-chip (SOC) type hardware that may include additional hardware such as memory or graphics processing chips, such as a QUALCOMM SNAPDRAGON™ or SAMSUNG EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one aspect, interfaces 15 are provided as network interface cards (NICs). Generally, NICs control the sending and receiving of data packets over a computer network; other types of interfaces 15 may for example support other peripherals used with computing device 10. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (WiFi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FD-DIs), and the like. Generally, such interfaces 15 may include physical ports appropriate for communication with appropriate media. In some cases, they may also include an independent processor (such as a dedicated audio or video processor, as is common in the art for high-fidelity A/N hardware interfaces) and, in some instances, volatile and/or non-volatile memory (e.g., RAM).

Although the system shown in FIG. 17 illustrates one specific architecture for a computing device 10 for implementing one or more of the aspects described herein, it is by no means the only device architecture on which at least a portion of the features and techniques described herein may be implemented. For example, architectures having one or any number of processors 13 may be used, and such processors 13 may be present in a single device or distributed among any number of devices. In one aspect, a single processor 13 handles communications as well as routing computations, while in other aspects a separate dedicated communications processor may be provided. In various aspects, different types of features or functionalities may be implemented in a system according to the aspect that includes a client device (such as a tablet device or smartphone running client software) and server systems (such as a server system described in more detail below).

Regardless of network device configuration, the system of an aspect may employ one or more memories or memory modules (such as, for example, remote memory block 16 and local memory 11) configured to store data, program instructions for the general-purpose network operations, or other information relating to the functionality of the aspects described herein (or any combinations of the above). Program instructions may control execution of or comprise an operating system and/or one or more applications, for example. Memory 16 or memories 11, 16 may also be configured to store data structures, configuration data, encryption data, historical system operations information, or any other specific or generic non-program information described herein.

Because such information and program instructions may be employed to implement one or more systems or methods described herein, at least some network device aspects may include nontransitory machine-readable storage media, which, for example, may be configured or designed to store program instructions, state information, and the like for performing various operations described herein. Examples of such nontransitory machine- readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a JAVA™ compiler and may be executed using a Java virtual machine or equivalent, or files containing higher level code that may be executed by the computer using an interpreter (for example, scripts written in Python, Perl, Ruby, Groovy, or any other scripting language).

Figure 18:
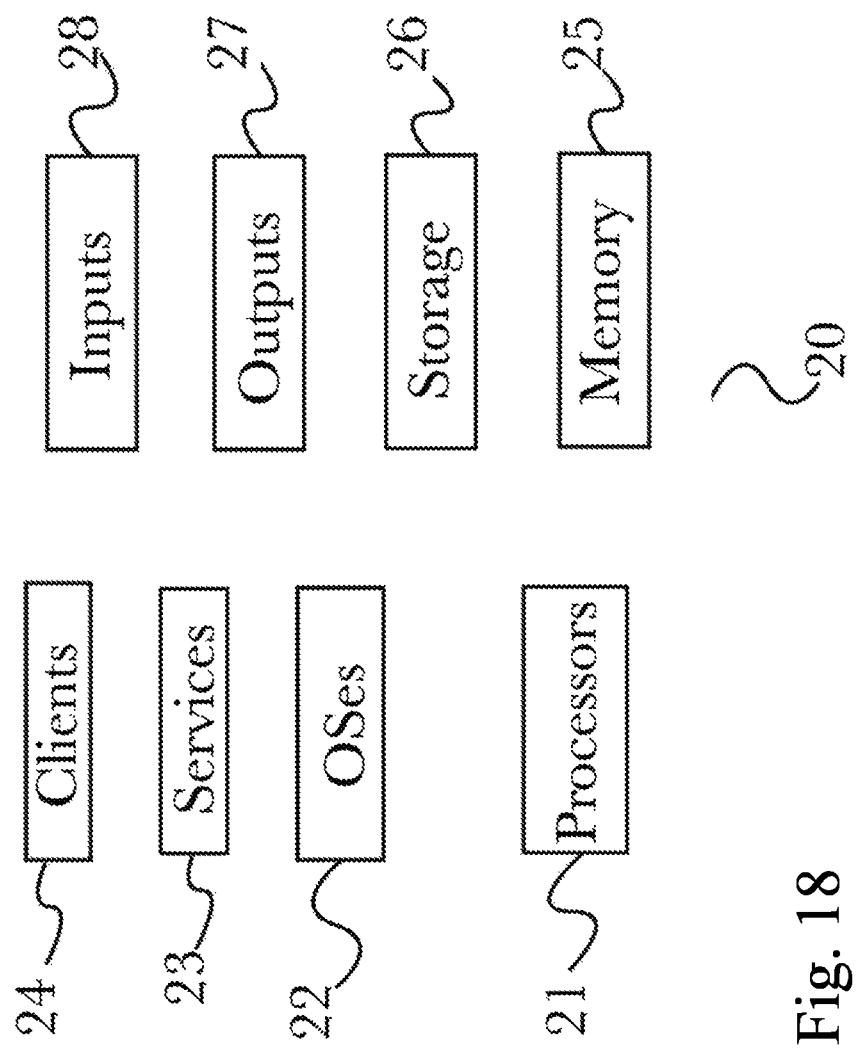
FIG. 18 is a block diagram illustrating an exemplary logical architecture for a client device.

In some aspects, systems may be implemented on a standalone computing system. Referring now to FIG. 18, there is shown a block diagram depicting a typical exemplary architecture of one or more aspects or components thereof on a standalone computing system. Computing device 20 includes processors 21 that may run software that carry out one or more functions or applications of aspects, such as for example a client application 24. Processors 21 may carry out computing instructions under control of an operating system 22 such as, for example, a version of MICROSOFT WINDOWS™ operating system, APPLE macOS™ or iOS™ operating systems, some variety of the Linux operating system, ANDROID™ operating system, or the like. In many cases, one or more shared services 23 may be operable in system 20, and may be useful for providing common services to client applications 24. Services 23 may for example be WINDOWS™ services, user-space common services in a Linux environment, or any other type of common service architecture used with operating system 21. Input devices 28 may be of any type suitable for receiving user input, including for example a keyboard, touchscreen, microphone (for example, for voice input), mouse, touchpad, trackball, or any combination thereof. Output devices 27 may be of any type suitable for providing output to one or more users, whether remote or local to system 20, and may include for example one or more screens for visual output, speakers, printers, or any combination thereof. Memory 25 may be random-access memory having any structure and architecture known in the art, for use by processors 21, for example to run software. Storage devices 26 may be any magnetic, optical, mechanical, memristor, or electrical storage device for storage of data in digital form (such as those described above, referring to FIG. 17). Examples of storage devices 26 include flash memory, magnetic hard drive, CD-ROM, and/or the like.

Figure 19:
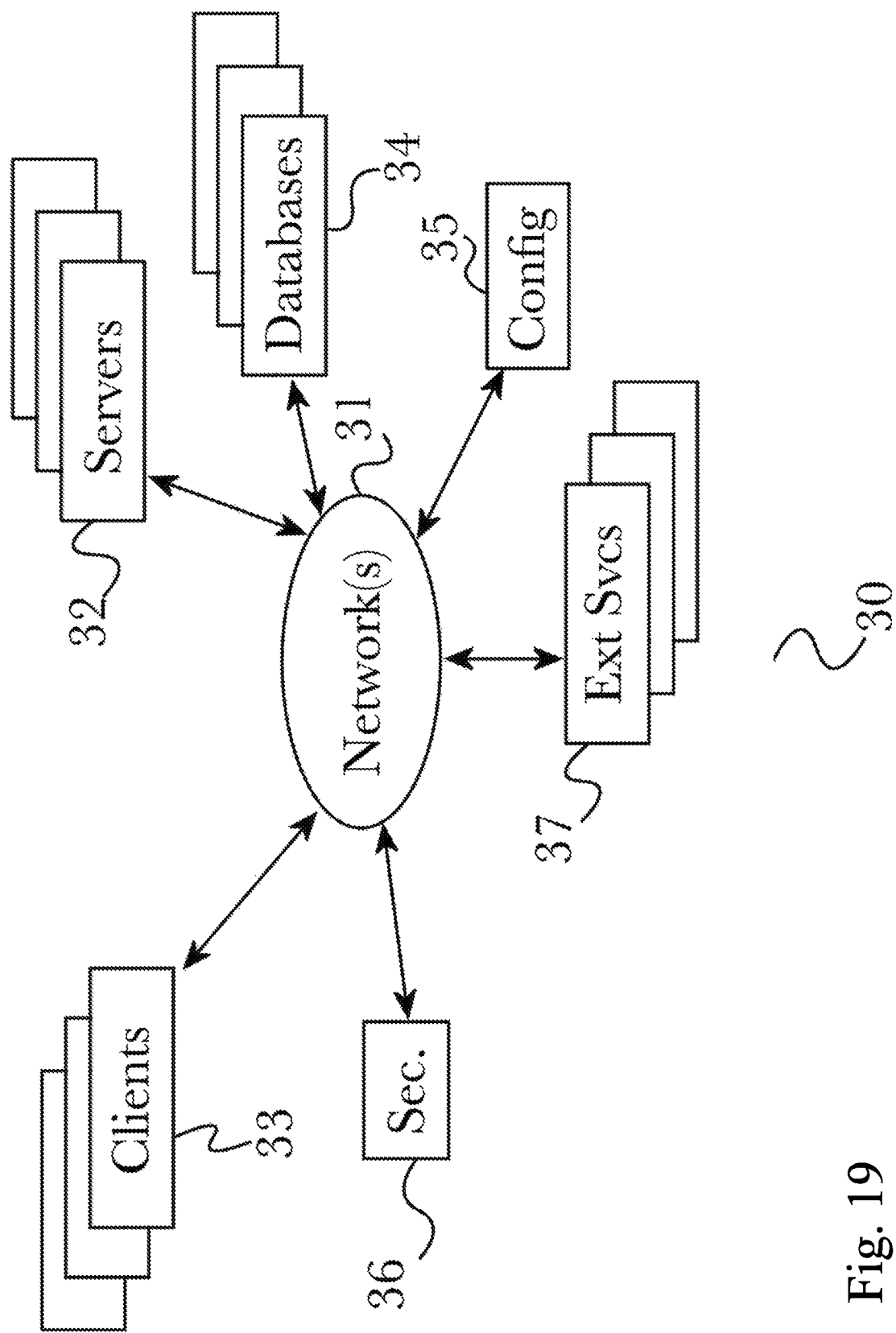
FIG. 19 is a block diagram showing an exemplary architectural arrangement of clients, servers, and external services.

In some aspects, systems may be implemented on a distributed computing network, such as one having any number of clients and/or servers. Referring now to FIG. 19, there is shown a block diagram depicting an exemplary architecture 30 for implementing at least a portion of a system according to one aspect on a distributed computing network. According to the aspect, any number of clients 33 may be provided. Each client 33 may run software for implementing client-side portions of a system; clients may comprise a system 20 such as that illustrated in FIG. 18. In addition, any number of servers 32 may be provided for handling requests received from one or more clients 33. Clients 33 and servers 32 may communicate with one another via one or more electronic networks 31, which may be in various aspects any of the Internet, a wide area network, a mobile telephony network (such as CDMA or GSM cellular networks), a wireless network (such as WiFi, WiMAX, LTE, and so forth), or a local area network (or indeed any network topology known in the art; the aspect does not prefer any one network topology over any other). Networks 31 may be implemented using any known network protocols, including for example wired and/or wireless protocols.

In addition, in some aspects, servers 32 may call external services 37 when needed to obtain additional information, or to refer to additional data concerning a particular call. Communications with external services 37 may take place, for example, via one or more networks 31. In various aspects, external services 37 may comprise web-enabled services or functionality related to or installed on the hardware device itself. For example, in one aspect where client applications 24 are implemented on a smartphone or other electronic device, client applications 24 may obtain information stored in a server system 32 in the cloud or on an external service 37 deployed on one or more of a particular enterprise's or user's premises.

In some aspects, clients 33 or servers 32 (or both) may make use of one or more specialized services or appliances that may be deployed locally or remotely across one or more networks 31. For example, one or more databases 34 may be used or referred to by one or more aspects. It should be understood by one having ordinary skill in the art that databases 34 may be arranged in a wide variety of architectures and using a wide variety of data access and manipulation means. For example, in various aspects one or more databases 34 may comprise a relational database system using a structured query language (SQL), while others may comprise an alternative data storage technology such as those referred to in the art as "NoSQL" (for example, HADOOP CASSANDRA™, GOOGLE BIGTABLE™, and so forth). In some aspects, variant database architectures such as column-oriented databases, in-memory databases, clustered databases, distributed databases, or even flat file data repositories may be used according to the aspect. It will be appreciated by one having ordinary skill in the art that any combination of known or future database technologies may be used as appropriate, unless a specific database technology or a specific arrangement of components is specified for a particular aspect described herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, some aspects may make use of one or more security systems 36 and configuration systems 35. Security and configuration management are common information technology (IT) and web functions, and some amount of each are generally associated with any IT or web systems. It should be understood by one having ordinary skill in the art that any configuration or security subsystems known in the art now or in the future may be used in conjunction with aspects without limitation, unless a specific security 36 or configuration system 35 or approach is specifically required by the description of any specific aspect.

Figure 20:
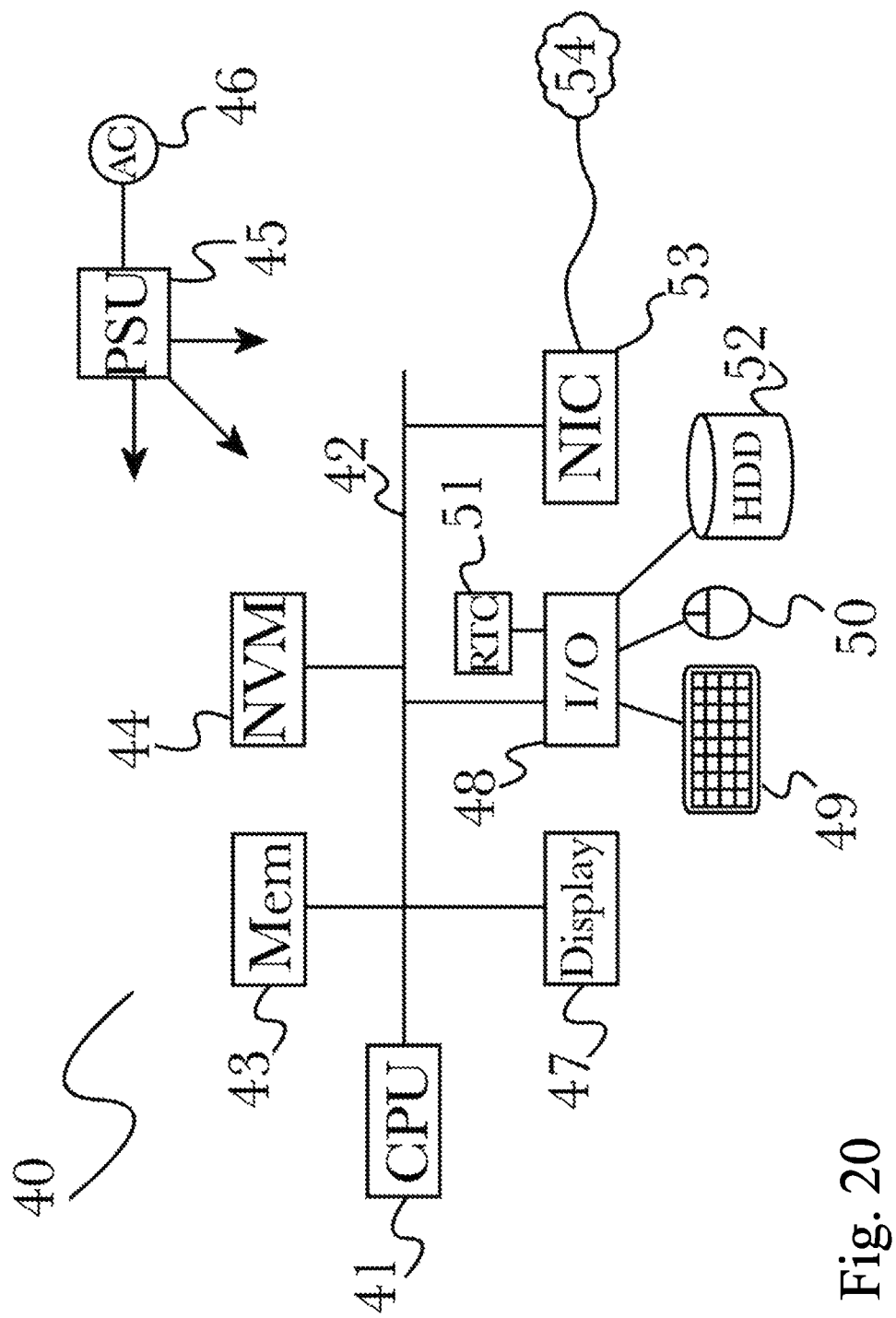
FIG. 20 is another block diagram illustrating an exemplary hardware architecture of a computing device.

FIG. 20 shows an exemplary overview of a computing device 40 as may be used in any of the various locations throughout the system. It is exemplary of any computer that may execute code to process data. Various modifications and changes may be made to computing device 40 without departing from the broader scope of the system and method disclosed herein. Central processor unit (CPU) 41 is connected to bus 42, to which bus is also connected memory 43, nonvolatile memory 44, display 47, input/output (I/O) unit 48, and network interface card (NIC) 53. I/O unit 48 may, typically, be connected to keyboard 49, pointing device 50, hard disk 52, and real-time clock 51. NIC 53 connects to network 54, which may be the Internet or a local network, which local network may or may not have connections to the Internet. Also shown as part of system 40 is power supply unit 45 connected, in this example, to a main alternating current (AC) supply 46. Not shown are batteries that could be present, and many other devices and modifications that are well known but are not applicable to the specific novel functions of the current system and method disclosed herein. It should be appreciated that some or all components illustrated may be combined, such as in various integrated applications, for example Qualcomm or Samsung system-on-a-chip (SOC) devices, or whenever it may be appropriate to combine multiple capabilities or functions into a single hardware device (for instance, in mobile devices such as smartphones, video game consoles, in-vehicle computing devices such as navigation or multimedia systems in automobiles, or other integrated hardware devices).

In various aspects, functionality for implementing systems or methods of various aspects may be distributed among any number of client and/or server components. For example, various software modules may be implemented for performing various functions in connection with the system of any particular aspect, and such modules may be variously implemented to run on server and/or client components.

The skilled person will be aware of a range of possible modifications of the various aspects described above. Accordingly, the present invention is defined by the claims and their equivalents.

One or more different aspects may be described in the present application. Further, for one or more of the aspects described herein, numerous alternative arrangements may be described; it should be appreciated that these are presented for illustrative purposes only and are not limiting of the aspects contained herein or the claims presented herein in any way. One or more of the arrangements may be widely applicable to numerous aspects, as may be readily apparent from the disclosure. In general, arrangements are described in sufficient detail to enable those skilled in the art to practice one or more of the aspects, and it should be appreciated that other arrangements may be utilized and that structural, logical, software, electrical and other changes may be made without departing from the scope of the particular aspects. Particular features of one or more of the aspects described herein may be described with reference to one or more particular aspects or figures that form a part of the present disclosure, and in which are shown, by way of illustration, specific arrangements of one or more of the aspects. It should be appreciated, however, that such features are not limited to usage in the one or more particular aspects or figures with reference to which they are described. The present disclosure is neither a literal description of all arrangements of one or more of the aspects nor a listing of features of one or more of the aspects that must be present in all arrangements.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible aspects and in order to more fully illustrate one or more aspects. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the aspects, and does not imply that the illustrated process is preferred. Also, steps are generally described once per aspect, but this does not mean they must occur once, or that they may only occur once each time a process, method, or algorithm is carried out or executed. Some steps may be omitted in some aspects or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other aspects need not include the device itself.

Techniques and mechanisms described or referenced herein will sometimes be described in singular form for clarity. However, it should be appreciated that particular aspects may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various aspects in which, for example, functions may be executed out of order from that shown or discussed, including substantially concurrently or in reverse order, depending on the functionality involved, as would be understood by those having ordinary skill in the art.

What is claimed is:

1. A method for creating synchronized video control data for sexual stimulation devices, comprising the steps of:
    displaying video content comprising depictions of sexual activity on a display;
    receiving motion input data from a manually-operated motion input system comprising a linear slider and a rotational dial, the motion input data corresponding to a movement shown in the video, wherein:
        the motion input data comprises a reciprocal linear motion with rotation about the linear axis of the reciprocal linear motion;
        the motion input data tracks a reciprocal linear motion with rotation about the linear axis of the reciprocal linear motion of the movement shown in the video over time; and
        each motion input datum is associated with a playback time of the video content; and
    storing the motion input data as metadata associated with the video content, wherein the metadata represents an emulation of the identified movement shown in the video content.

2. The method of claim 1, further comprising the steps of:
    retrieving the video content and the metadata;
    converting the metadata to device control data, the device control data comprising a position of an electronically controllable moving part of a sexual stimulation device for each motion input datum and playback time;
    displaying the video content; and
    as the video content is displayed, continuously determining a current playback time of the video content and transmitting the device control data for that current playback time to the sexual stimulation device.

3. The method of claim 1, further comprising the steps of:
    establishing a user portal for users to create user accounts; and
    allowing users to annotate videos by watching videos containing sexual content and providing motion input data for the watched videos.

4. The method of claim 3, further comprising the step of configuring wherein the user portal is further configured to allow users to establish an online store for sale of their video annotations to other users.

5. The method of claim 1, further comprising the steps of:
    allowing users to enter preferences as to video content;
    searching local storage or the Internet for videos containing content related to the user's preferences; and
    if the videos are not already annotated, allowing the users to annotate the video content; and
    using the video content to control the sexual stimulation device.

* * * * *